United States Patent
Moon et al.

(10) Patent No.: US 10,992,234 B2
(45) Date of Patent: Apr. 27, 2021

(54) ADAPTIVE CONTROL OF SYNCHRONOUS RECTIFIER SWITCHING DEVICE

(71) Applicant: SEMICONDUCTOR COMPONENTS INDUSTRIES, LLC, Phoenix, AZ (US)

(72) Inventors: Sangcheol Moon, Bucheon-si (KR); Jintae Kim, Seongnam-si (KR); Chi-Chen Chung, Zhubei (TW); Cheng-Sung Chen, Hsinchu (TW)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 170 days.

(21) Appl. No.: 15/877,573

(22) Filed: Jan. 23, 2018

(65) Prior Publication Data

US 2019/0229634 A1    Jul. 25, 2019

(51) Int. Cl.
*H02M 3/335*     (2006.01)
*H02M 1/00*      (2006.01)

(52) U.S. Cl.
CPC .......... *H02M 3/33592* (2013.01); *H02M 2001/0032* (2013.01)

(58) Field of Classification Search
CPC ............. H02M 3/33569; H02M 2001/0032
See application file for complete search history.

(56) References Cited

U.S. PATENT DOCUMENTS

| 2015/0145562 A1* | 5/2015 | Vermeir | H05K 13/00 327/87 |
| 2017/0040904 A1* | 2/2017 | Kikuchi | H02M 3/33592 |
| 2018/0013352 A1* | 1/2018 | Cao | H02M 3/33507 |

OTHER PUBLICATIONS

Sangcheol Moon et al. "Automatic Control of Synchronous Rectifier Turn-Off Threshold," U.S. Appl. No. 15/486,919, filed Apr. 13, 2017.
Semiconductor Components Industries, LLC, NCP4306 "Secondary Side Synchronous Rectification Driver for High Efficiency SMPS Topologies," Nov. 2017.

* cited by examiner

*Primary Examiner* — Fred EE Finch, III
*Assistant Examiner* — Rafael O De Leon Domenech
(74) *Attorney, Agent, or Firm* — AMPACC Law Group, PLLC

(57) ABSTRACT

A circuit for controlling a power converter includes an SR switching device, a light load detection circuit generating a load detection signal in response to a conduction signal and an operation mode signal, and an SR driver generating a control signal having a value according to the load detection signal and provide the control signal to the SR switching device. A method of controlling a power converter includes generating a load detection signal in response to a conduction signal and an operation mode signal and generating a control signal having a value according to the load detection signal. The control signal has a first value when the load detection signal is asserted and has a second value when the load detection signal is de-asserted.

17 Claims, 15 Drawing Sheets

ADAPTIVE CONTROL OF SYNCHRONOUS RECTIFIER SWITCHING DEVICE

FIELD OF THE DISCLOSURE

The present disclosure relates generally to rectifying circuits, and more particularly to synchronous rectifier control circuits used in power converters.

BACKGROUND

The present disclosure relates, in general, to electronics, and more particularly, to circuits and method for providing power to electronic devices. Such circuits may use Synchronous Rectification (SR) circuits, in which an Alternating Current (AC) supply voltage is rectified using one or more switching devices, such as transistors, that are switched on and off synchronously with the AC supply voltage.

The switching devices may be controlled by signals from an SR control circuit. When each of the switching devices is turned on or off in response to a control signal from the SR control circuit, conduction loss and switching loss of the switching devices may lead to a reduction in power efficiency of the circuits including the SR control circuit and the switching devices.

BRIEF DESCRIPTION OF THE DRAWINGS

In the accompanying figures like reference numerals refer to identical or functionally similar elements throughout the separate views, together with the detailed description below, and are incorporated in and form part of the specification to further illustrate embodiments of concepts that include the claimed invention and explain various principles and advantages of those embodiments.

DETAILED DESCRIPTION

Figure 1:
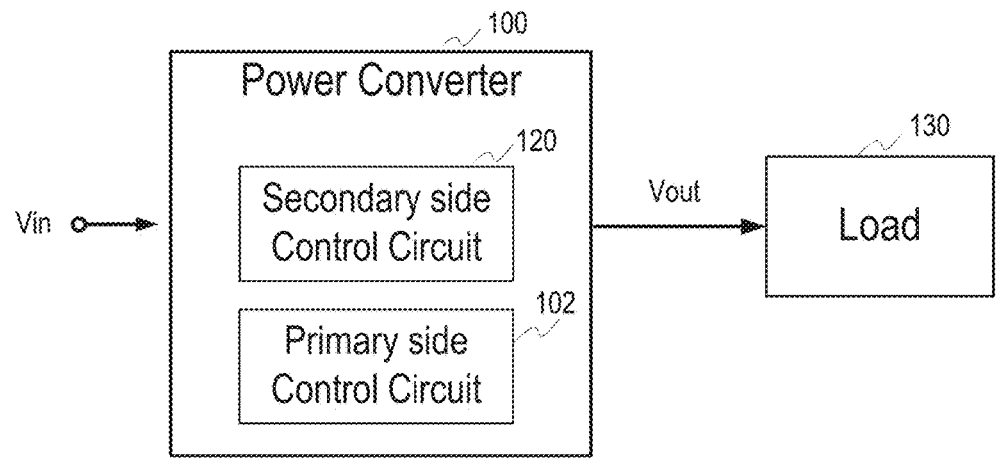
FIG. 1 illustrates a power converter according to an embodiment

Embodiments relate to a circuit for controlling a power converter and a method of controlling the power converter.

In the following detailed description, certain illustrative embodiments have been illustrated and described. As those skilled in the art would realize, these embodiments may be modified in various different ways without departing from the scope of the present disclosure. Accordingly, the drawings and description are to be regarded as illustrative in nature and not restrictive. Like reference numerals designate like elements in the specification.

In an embodiment, a circuit for controlling a power converter includes an SR switching device, a light load detection circuit configured to generate a load detection signal in response to a conduction signal and one or both of a detected signal (e.g., a drain-to-source voltage) of the SR switching device and an operation mode signal, and an SR driver configured to generate a control signal having a value according to the load detection signal and provide the control signal to the SR switching device. For example, the operation mode signal indicates the power converter is operating in a specific mode under a light load condition, for example, a critical conduction mode (CRM, also known as Boundary Conduction Mode (BCM)) or a discontinuous conduction mode (DCM) for a flyback converter, or a below resonance mode for an LLC resonant converter.

In an embodiment, a circuit for controlling a power converter detects a light load condition, produces a gate control signal having a first voltage value when the light load condition is detected, and produces the gate control signal having a second voltage value when the light load condition is not detected, the second voltage value being greater than the first voltage value. As a result, overall circuit efficiency of the circuit for controlling a power converter across a range of load conditions may be improved.

FIG. 1 is a block diagram illustrating a power converter 100 according to an embodiment. The power converter 100 in FIG. 1 receives an input signal (e.g., an input voltage) $V_{in}$ and provides an output signal (e.g., an output voltage) $V_{out}$ to a load 130 in FIG. 1. In an embodiment, the power converter 100 is controlled by a primary side control circuit 102 and a secondary side control circuit 120.

The primary side control circuit 102 and the secondary side control circuit 120 may be integrated in one or more semiconductor chips. These semiconductor chips may be packaged by themselves or together with one or more other semiconductor chips. For example, the secondary side control circuit 120 may include one or more SR controllers.

The load 130 may include one or more integrated chips (ICs). In an embodiment, the output voltage $V_{out}$ is used to supply power to one or more of a Central Processing Unit (CPU), a Graphics Processing Unit (GPU), an integrated memory circuit, a battery charger, a light emitting diode (LED), or generally any type of electrical load.

The power converter 100 may include a Switched Mode Power Supply (SMPS) operating by controlling a current through an energy storage device, typically an inductor or a primary coil of a transformer. A SMPS may operate in one or more of a Continuous Conduction Mode (CCM), a Boundary Conduction Mode (BCM) (also referred to as a Critical Conduction Mode (CRM)), and a Discontinuous Conduction Mode (DCM), according to operating conditions such as a current drawn by the load 130.

In CCM, a magnitude of a current flowing in the energy storage device rises (while energy is being stored in the energy storage device) and falls (while energy is being withdrawn from the energy storage device) but never drops to zero.

In BCM or CRM, when the magnitude of the current flowing in the energy storage device falls to zero, the SMPS turns on a switching device to provide a current to the energy storage device, so that the magnitude of the current is zero only momentarily.

In DCM, when the magnitude of the current flowing in the energy storage device falls to zero, the SMPS waits before turning on the switching device to provide a current to the energy storage device. The SMPS may, for example, wait a predetermined blanking time, or may wait for an $N^{th}$ occurrence of the current flowing in the energy storage device being zero when ringing occurs in the current.

Figure 2:
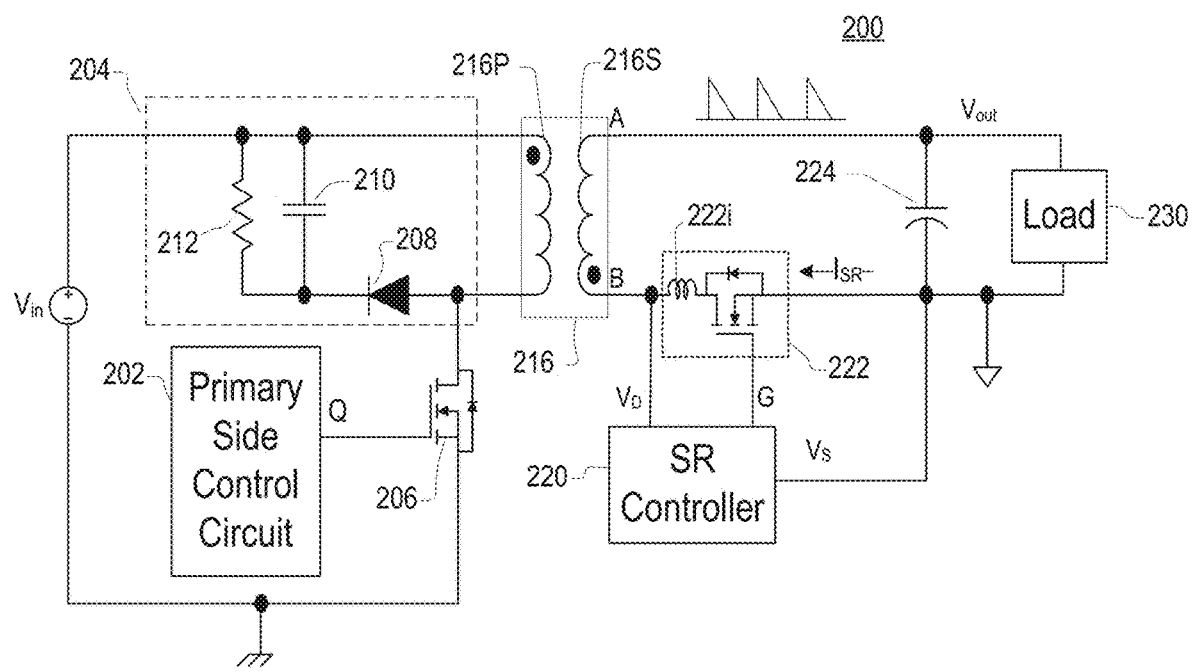
FIG. 2 illustrates a flyback converter according to an embodiment.

FIG. 2 is a block diagram illustrating a flyback converter 200 according to an embodiment. A primary side of the flyback controller 200 includes a primary side control circuit (or a flyback controller circuit) 202, a Metal Oxide Semiconductor Field Effect Transistors (MOSFET) 206, a snubber network 204 including a capacitor 210, a diode 208, and a resistor 212, and a primary coil 216P of a transformer 216. A secondary side of the flyback controller 200 includes a secondary coil 216S of the transformer 216, a secondary side control circuit including a Synchronous Rectifier (SR) controller 220, an SR switching device 222, and an output capacitor 224. In an embodiment, the SR switching device 222 is a MOSFET, such as an n-channel power MOSFET.

The power converter 200 in FIG. 2 receives an input voltage $V_{in}$, and provides an output voltage $V_{out}$ to a load 230. In an embodiment, the output voltage $V_{out}$ may be varied.

The flyback controller circuit 202 in FIG. 2 generates a drive signal Q that is a square wave. A frequency of the drive signal Q may vary according to, for example, the output voltage $V_{out}$.

During a first portion (e.g., an on-time duration) of a cycle of the drive signal Q, the flyback controller circuit 202 turns on the MOSFET 206. This causes energy to be supplied from the input voltage $V_{in}$ to the primary coil 216P, where it is stored as a magnetic flux.

During a second portion (e.g., an off-time duration) of a cycle of the drive signal Q, the flyback controller circuit 202 turns off the MOSFET 206. In response, the energy stored in the primary coil 216P is transferred into the secondary coil 216S, causing a current to flow in the secondary coil 216S and a voltage to develop across the A and B terminals of the secondary coil 216S. The snubber network 204 operates to prevent a turn-off voltage generated across the primary coil 216P from exceeding a breakdown voltage of the MOSFET 206.

The SR controller 220 in FIG. 2 controls the SR switching device 222 to rectify the output of the secondary coil 216S, charging the output capacitor 224 and thereby providing the output voltage $V_{out}$. The SR controller 220 controls the SR switching device 222 in response to a drain voltage $V_D$ sensed at a first conduction terminal (e.g., a drain terminal) of the SR switching device 222. In the embodiment shown in FIG. 2, the drain voltage $V_D$ is sensed relative to a source voltage of a second conduction terminal (e.g. a source terminal) of the SR switching device 222. In another embodiment, the drain voltage $V_D$ may be sensed relative to a ground potential. The SR controller 220 controls the SR switching device 222 using a gate control signal G coupled to a control terminal (e.g., a gate) of the SR switching device 222.

When the voltage across the secondary coil 216S has a first polarity, wherein the A terminal of the secondary coil 216S is negative relative to the B terminal of the secondary coil 216S, a body diode of the SR switching device 222 is reverse biased and no current flows through the body diode. The sensed drain voltage $V_D$ is greater than an off threshold voltage (e.g., an off threshold voltage $V_{TH.off}$ in FIG. 4B) and in response the SR controller 220 outputs the gate control signal G having a value that turns off the SR switching device 222. As a result, no current flows from the secondary coil 216S to the output capacitor 224.

When the voltage across the secondary coil 216S changes to a second polarity, wherein the A terminal is positive relative to the B terminal, the body diode of the SR switching device 222 begins to conduct. The sensed drain voltage $V_D$ becomes less than an on threshold voltage (e.g., an on threshold voltage $V_{TH.on}$ in FIG. 4B) and in response the SR controller 220 outputs the gate control signal G having a value that turns on the SR switching device 222. As a result, current flows from the secondary coil 216S to the output capacitor 224.

When the voltage across the secondary coil 216S starts to change back to the first polarity, the magnitude of the sensed drain voltage $V_D$ decreases and rises above the off threshold voltage. In response, the SR controller 220 outputs the gate control signal G having the value that turns off the SR switching device 222. The SR controller 220 may turn the SR switching device 222 off before the voltage across the secondary coil 216S changes to the first polarity.

The SR switching device 222 may include a stray inductance 222i between the point where the drain voltage $V_D$ is measured and the reference point against which the drain voltage $V_D$ is measured. The stray inductance 222i may include, for example, one or both of an inductance of one or more package leads of the SR switching device 222 and an inductance of one or more Printed Circuit Board (PCB) traces. The stray inductance 222i may be, for example, as much as 15 nanoHenries (nH).

The stray inductance 222i is in the path of the SR current $I_{SR}$ flowing through the SR switching device 222. An induced difference voltage $V_{DIF}$ is generated across the stray inductance 222i according to the stray inductance value $L_{stray}$ of the stray inductance 222i and the rate of change $\partial I_{SR}/\partial t$ in the SR current $I_{SR}$:

$$V_{DIF} = L_{stray} \times \frac{\partial I_{SR}}{\partial t} \qquad \text{Equation 1}$$

In an embodiment, the SR controller 220 in FIG. 2 uses a virtual off threshold voltage (e.g., a virtual off threshold voltage $V_{VTH.off}$ in FIG. 4B) to mitigate the effect of stray inductances on the on time of the SR switching device 222. In an embodiment, the SR controller 220 adjusts the virtual off threshold voltage to mitigate the effect of stray inductances on the on time of the SR switching device 222.

The flyback converter 200 may include additional elements, such as feedback circuits, sleep circuits, startup circuits, protection circuits, and the like, which are have been omitted in the interest of brevity.

Figure 3:
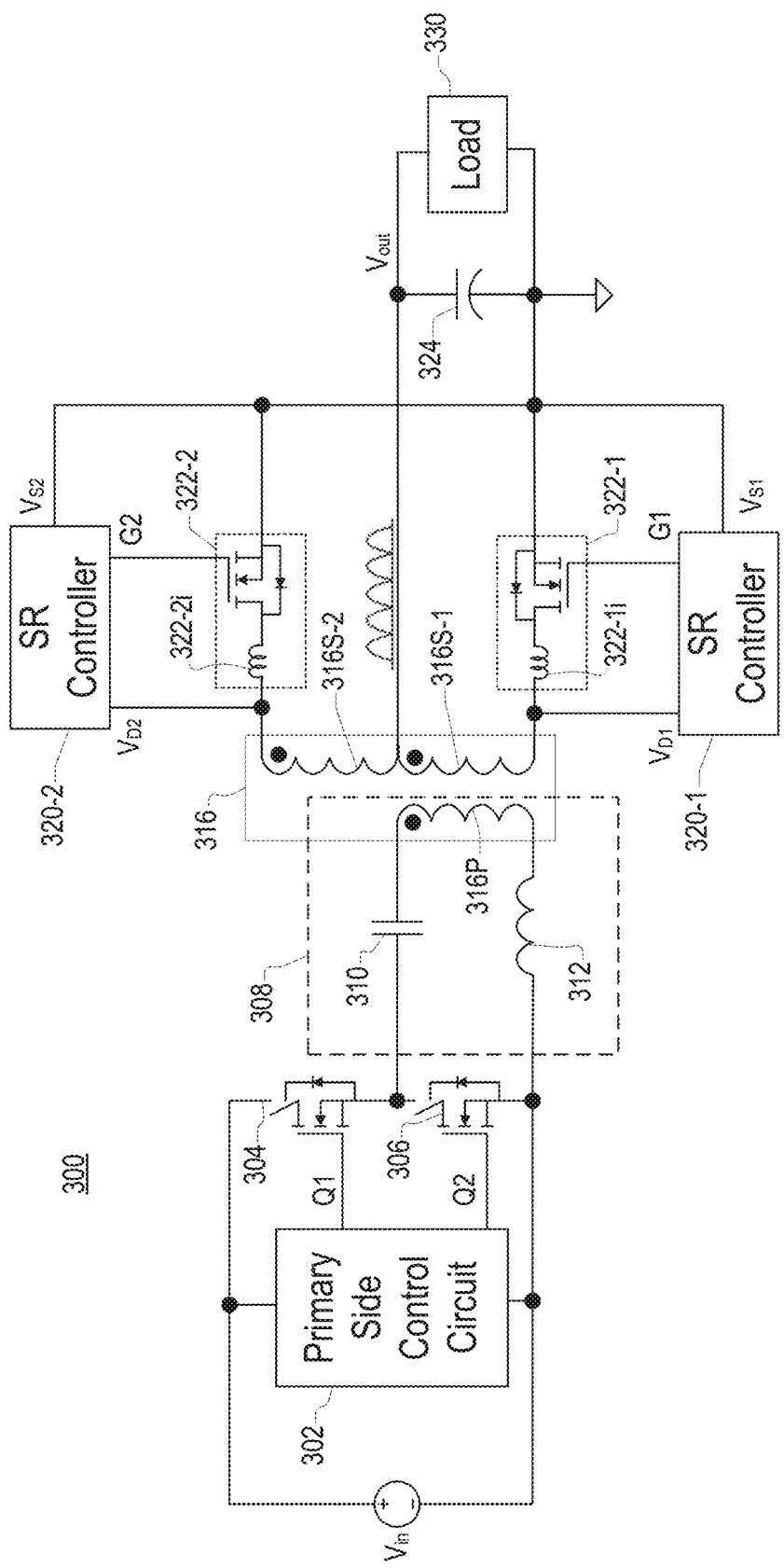
FIG. 3 illustrates a full-wave power converter according to an embodiment.

FIG. 3 is a block diagram illustrating a full-wave power converter 300 according to an embodiment. A primary side of the power controller 300 includes a primary side controller circuit 302, first and second Metal Oxide Semiconductor Field Effect Transistors (MOSFETs) 304 and 306, and an Inductor-Inductor-Capacitor (LLC) tank circuit 308 including a tank capacitor 310, a tank inductor 312, and a primary coil 316P of a transformer 316. A secondary side of the power converter 300 includes first and second secondary coils 316S-1 and 316S-2 of the transformer 316, a second side control circuit including first and second SR controllers 320-1 and 320-2, first and second SR switching devices 322-1 and 322-2, and an output capacitor 324. In an embodiment, the SR switching devices 322-1 and 322-2 are MOSFETs, such as n-channel power MOSFETs.

The power converter 300 in FIG. 3 receives an input voltage $V_{in}$, and provides an output voltage $V_{out}$ to a load 330. In an embodiment, the output voltage $V_{out}$ may be varied.

The primary side control circuit 302 in FIG. 3 generates first and second drive signals Q1 and Q2, which are square waves and are 180 degrees out of phase with respect to each other. A frequency of the first and second drive signals Q1 and Q2 may vary according to, for example, the output voltage $V_{out}$.

Using the first and second drive signals Q1 and Q2, the primary side controller circuit 302 first supplies energy from the input voltage $V_{in}$ to the tank circuit 308 by turning on the first MOSFET 304 and turning off the second MOSFET 306. The primary side control circuit 302 then allows the tank circuit 308 to oscillate by turning off the first MOSFET 304 and turning on the second MOSFET 306.

The transformer 316 of the power converter 300 is a center-tap transformer including the first and second secondary coils 316S-1 and 316S-2. Polarities of voltages across the first and second secondary coils 316S-1 and 316S-2, relative to the center tap, will be opposite each other.

The secondary side of the power converter 300 includes the output capacitor 324 that is used to provide the output voltage $V_{out}$ to the load 330. Current is provided to the output capacitor 324 using the first SR switching device 322-1 controlled by the first SR controller 320-1 and by the second SR switching device 322-2 controlled by the second SR controller 320-2.

The first SR switching device 322-1 is coupled to the first secondary coil 316S-1 and the second SR switching device 322-2 is coupled to the second secondary coil 316S-2. Because the polarities of voltages across the first and second secondary coils 316S-1 and 316S-2, relative to the center tap, will be opposite each other, the first SR switching device 322-1 will provide current to the output capacitor 324 when the second SR switching device 322-2 is off, and the second SR switching device 322-2 will provide current to the output capacitor 324 when the first SR switching device 322-1 is off.

In an embodiment, the first and second SR controllers 320-1 and 320-2 are provided in a single semiconductor device. In an embodiment, the first and second SR controllers 320-1 and 320-2 share circuits that perform functions common thereto.

The first and second SR switching devices 322-1 and 322-2 include respective first and second stray inductances 322-1$i$ and 322-2$i$. Embodiment of the power converter 300 include circuits and processes to mitigate the effects of the first and second stray inductances 322-1$i$ and 322-2$i$ using at least one virtual off threshold voltage, as described below.

Figure 4A:
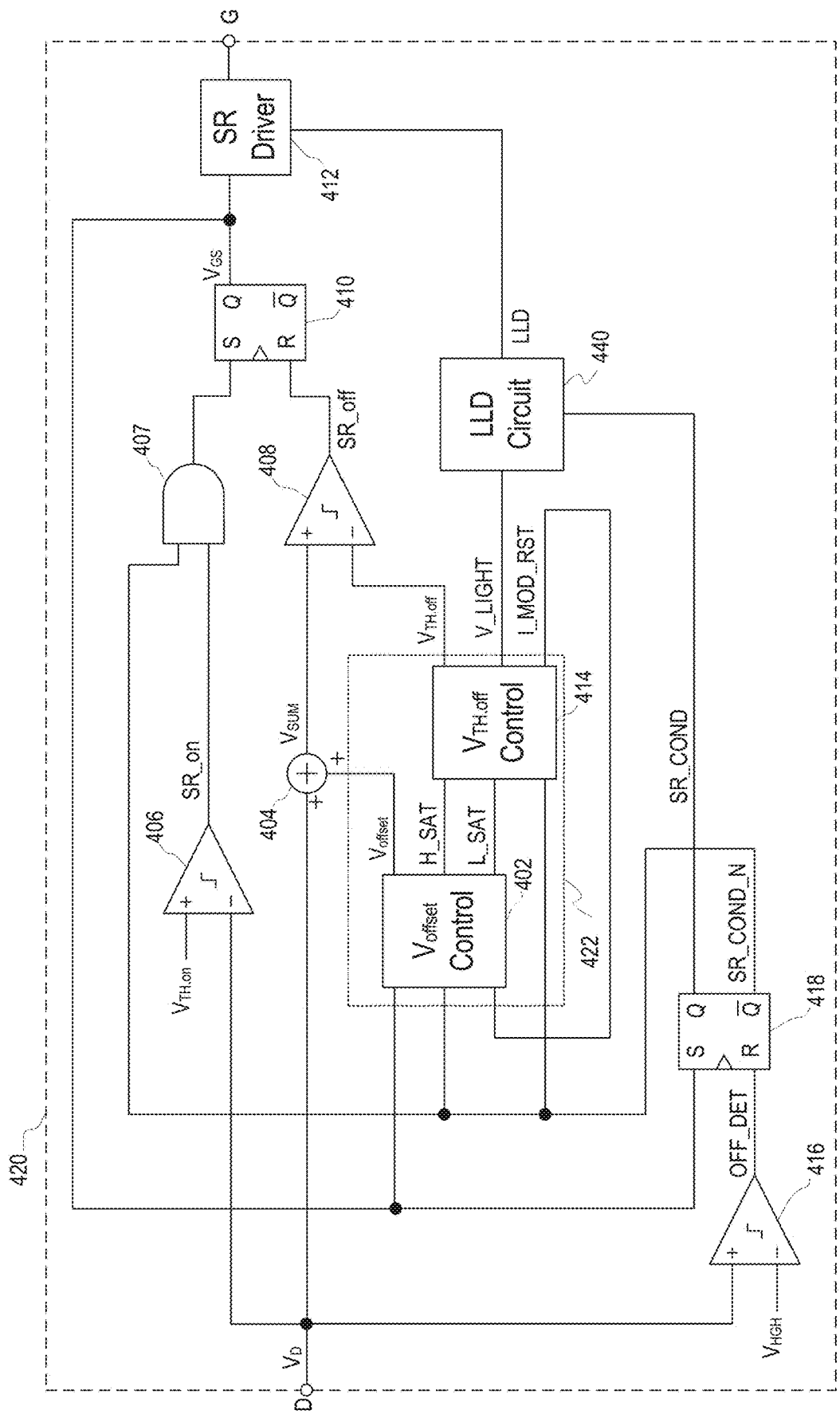
FIG. 4A illustrates a Synchronous Rectifier (SR) controller according to an embodiment.

FIG. 4A illustrates an SR controller circuit (hereinafter, SR controller) 420 (hereinafter, SR controller 420) according to an embodiment. The SR controller 420 is suitable for use as the SR controller 220 of the flyback converter 200 of FIG. 2 or as one or both of the SR controllers 320-1 and 320-2 of the power converter 300 of FIG. 3.

The SR controller 420 in FIG. 4A receives a drain voltage $V_D$ at a drain input D and generates a gate control signal G suitable for controlling an SR switching device, such as the SR switching devices 222 in FIGS. 2 and 322-1 and 322-2 in FIG. 3. In the embodiment of FIG. 4A, the SR controller circuit 420 senses the drain voltage $V_D$ relative to a ground (not shown), but embodiments are not limited thereto.

The SR controller 420 in FIG. 4A includes first, second, and third comparators 406, 408, and 416, a summing circuit 404, an AND gate 407, first and second set-reset flip-flops (SRFFs) 410 and 418, a Synchronous Rectifier (SR) driver 412, a light load detection (LLD) circuit 440, and an adaptive control circuit 422. The adaptive control circuit 422 includes an offset voltage control circuit 402 (hereinafter, offset voltage controller 402) and an off threshold control circuit 414 (hereinafter, off threshold controller 414).

The first comparator 406 in FIG. 4A receives the drain voltage $V_D$ and an on threshold voltage $V_{TH.on}$, and generates an SR on signal SR_on. The first comparator 406 asserts the SR on signal SR_on in response to the drain voltage $V_D$ being less than the on threshold voltage $V_{TH.on}$ and de-asserts the SR on signal SR_on in response to the drain voltage $V_D$ being greater than the on threshold voltage $V_{TH.on}$. In an embodiment, the first comparator 406 includes hysteresis to prevent oscillation of the SR on signal SR_on when the drain voltage $V_D$ is substantially equal to the threshold voltage $V_{TH.on}$.

The summing circuit 404 in FIG. 4A receives the drain voltage $V_D$ and an offset voltage $V_{offset}$ and generates a voltage sum $V_{SUM}$ equal to the sum of the drain voltage $V_D$ and an offset voltage $V_{offset}$.

The second comparator 408 in FIG. 4A receives the voltage sum $V_{SUM}$ and an off threshold voltage $V_{TH.off}$, and generates an SR off signal SR_off. The second comparator 408 asserts the SR off signal SR_off in response to the voltage sum $V_{SUM}$ being greater than the off threshold voltage $V_{TH.off}$ and de-asserts the SR off signal SR_off in response to the voltage sum $V_{SUM}$ being less than the off threshold voltage $V_{TH.off}$. In an embodiment, the second comparator 408 includes hysteresis to prevent oscillation of the SR off signal SR_off when the voltage sum $V_{SUM}$ is substantially equal to the off threshold voltage $V_{TH.off}$.

The operation of the summing circuit 404 and the second comparator 408 is equivalent to comparing the drain voltage $V_D$ to a virtual off threshold $V_{VTH.off}$, wherein the virtual off threshold $V_{VTH.off}$ is equal to the off threshold voltage $V_{TH.off}$ minus the offset voltage $V_{offset}$. The second comparator 408 asserts the SR off signal SR_off in response to the drain voltage $V_D$ being greater than the virtual off threshold voltage $V_{VTH.off}$ and de-asserts the SR off signal SR_off in response to the drain voltage $V_D$ being less than the virtual off threshold voltage $V_{VTH.off}$.

The AND gate 407 in FIG. 4A receives the SR on signal SR_on and a negated SR conduction signal SR_COND_N. The AND gate 407 generates an output that is coupled to the set input S of the first SRFF 410. The output of the AND gate 407 is asserted when the SR on signal SR_on is asserted and the negated SR conduction signal SR_COND_N is asserted, and is de-asserted otherwise.

The first SRFF 410 in FIG. 4A sets a gate signal $V_{GS}$ to an asserted (e.g., a logic high) value in response to the SR on signal SR_on being asserted while the negated SR conduction signal SR_COND_N is asserted. The first SRFF 410 resets the gate signal $V_{GS}$ in response to the SR off signal SR_off being asserted. When neither of these conditions is true, the first SRFF 410 maintains the gate signal $V_{GS}$ in its current state.

The operation of the summing circuit 404, first and second comparators 406 and 408, and first SRFF 410 may be summarized as:

$$V_{VTH.off} = V_{TH.off} - V_{offset} \qquad \text{Equation 2;}$$

$$V_D < V_{TH.on} \text{ and } SR\_COND\_N \text{ asserted} \rightarrow \text{set } V_{GS} \qquad \text{Equation 3; and}$$

$$V_D > V_{VTH.off} \rightarrow \text{reset } V_{GS} \qquad \text{Equation 4.}$$

The SR driver 412 in FIG. 4A receives the gate signal $V_{GS}$ and generates the gate control signal G. In an embodiment, the SR driver 412 may generate the gate control signal G by delaying a rising edge of the gate signal $V_{GS}$ in order to provide a guaranteed off time of the SR switching device being controlled by the gate control signal G. In other words, the SR driver 412 may provide a turn on delay when generating the gate control signal G.

The third comparator 416 in FIG. 4A receives the drain voltage $V_D$ and an SR off detection threshold $V_{HGH}$, and generates an off detection signal OFF_DET. The off detection signal OFF_DET may be used to indicate that the SR switching device being controlled by the SR controller 420 is not conducting current. The third comparator 416 asserts the off detection signal OFF_DET when the drain voltage $V_D$ is greater than the SR off detection threshold $V_{HGH}$, and de-asserts the off detection signal OFF_DET when the drain voltage $V_D$ is less than the SR off detection threshold $V_{HGH}$. Note that at least because current may flow through the body diode of the SR switching device, turning off the SR switching device does not guarantee that current is not flowing through the SR switching device.

In an embodiment, the third comparator 416 includes hysteresis to prevent oscillation of the off detection signal OFF_DET when the drain voltage $V_D$ is substantially equal to the SR off detection threshold $V_{HGH}$. In an embodiment, the SR off detection threshold $V_{HGH}$ is greater (more positive) than the virtual off threshold voltage $V_{VTH.off}$.

The second SRFF 418 in FIG. 4A receives the gate signal $V_{GS}$ and the off detection signal OFF_DET and generates a negated SR conduction signal SR_COND_N. The second SRFF 418 sets the negated SR conduction signal SR_COND_N to an asserted value in response to the off detection signal OFF_DET being asserted. The second SRFF 418 resets the negated SR conduction signal SR_COND_N in response to the gate signal $V_{GS}$ being asserted. When neither the off detection signal OFF_DET nor the gate signal $V_{GS}$ are asserted, the second SRFF 418 maintains the negated SR conduction signal SR_COND_N in its current state.

Accordingly, the negated SR conduction signal SR_COND_N is de-asserted during each of time periods beginning at an assertion of the gate signal $V_{GS}$ and ending at an assertion of the off detection signal OFF_DET, and is asserted between such periods.

The offset voltage controller 402 in FIG. 4A receives the gate signal $V_{GS}$, the negated SR conduction signal SR_COND_N, and an offset reset signal I_MOD_RST. Using those signals, the offset controller 402 generates the offset voltage $V_{offset}$, a high saturation signal H_SAT indicating that an internal count of the offset voltage controller 402 used to generate the offset voltage $V_{offset}$ has hit a maximum value, and a low saturation signal L_SAT indicating that the internal count of the offset voltage controller 402 has hit a minimum value. The offset voltage controller 402 will be described below with reference to FIG. 5.

The off threshold controller 414 in FIG. 4A receives the negated SR conduction signal SR_COND_N, the high saturation signal H_SAT, and the low saturation signal L_SAT. Using those signals, the off threshold controller 414 generates the off threshold voltage $V_{TH.off}$, the offset reset signal I_MOD_RST, and an operation mode signal V_LIGHT. The offset reset signal I_MOD_RST indicates that the offset voltage controller 402 should reset the offset voltage $V_{offset}$. The operation mode signal signal V_LIGHT indicates that a power converter including the SR controller 420 is operating in a specific mode under a light load condition, for example, a critical conduction mode (CRM, also known as Boundary Conduction Mode (BCM)) or a discontinuous conduction mode (DCM) for the flyback converter 200 in FIG. 2, or a below resonance mode in the power converter 300 in FIG. 3. The off threshold controller 414 will be described below with reference to FIG. 6.

The light load detection circuit 440 in FIG. 4A receives the operation mode signal V_LIGHT and the SR conduction signal SR_COND, and generates a light load detection signal LLD. The light load detection signal indicates that the power converter including the SR controller 420 is operating in a light load condition. The LLD circuit 440 will be described below with reference to FIGS. 7A and 7B, 8, 9, 10, 11A, and 11B.

The SR driver 412 in FIG. 4 receives the light load detection signal LLD and adjusts a magnitude of the gate control signal G in response to the light load detection signal LLD. In particular, the SR driver 412 adjusts, in response to the light load detection signal LLD, the magnitude of the value of the gate signal G that turns on an SR switching device coupled to the gate signal G. In an embodiment, the SR driver 412 decreases the magnitude of the gate control signal G in response to the light load detection signal LLD having an asserted value (e.g., a logic high value). The SR driver 412 will be described below with reference to FIG. 13.

Figure 4B:
FIG. 4B includes waveforms illustrating operation of the SR controller of FIG. 4A according to an embodiment.

FIG. 4B includes waveforms illustrating operation during a period when the virtual off threshold $V_{VTH.off}$ is held constant of the SR controller 420 of FIG. 4A according to an embodiment. FIG. 4B includes waveforms of the drain voltage $V_D$, the gate control signal G, and the negated SR conduction signal SR_COND_N.

Before a first time $t_1$, a secondary side current conducts through a body diode of an SR switching device (e.g., the SR switching device 222 of FIG. 2) being controlled by the SR controller 420. As a result, the drain voltage $V_D$ of the SR switching device decreases until the drain voltage $V_D$ reaches the on threshold voltage $V_{TH.on}$.

At the first time $t_1$, the drain voltage $V_D$ dropping below the on threshold voltage $V_{TH.on}$ during a period when the negated SR conduction signal SR_COND_N is asserted causes the gate signal $V_{GS}$ to be asserted. The gate signal $V_{GS}$ being asserted causes the negated SR conduction signal SR_COND_N to be de-asserted, and after a turn-on delay $T_{ON\_DLY}$ provided the SR driver 412, causes the gate control signal G to be asserted at a second time $t_2$, turning on the SR switching device. Turning on the SR switching device lowers the resistance of the SR switching device, causing the absolute magnitude of the drain voltage $V_D$ to decrease which, because the drain voltage $V_D$ is a negative voltage, causes the value of the drain voltage $V_D$ to increase.

As the current through the SR switching device decreases, the absolute magnitude of the drain voltage $V_D$ decreases proportionally, and the value of the drain voltage $V_D$ further increases.

At a third time $t_3$, the drain voltage $V_D$ reaches and exceeds the virtual off threshold voltage $V_{VTH.off}$. The drain voltage $V_D$ rising above the virtual off threshold voltage $V_{VTH.off}$ causes the gate signal $V_{GS}$ of FIG. 4A to be de-asserted, which causes the gate control signal G to be de-asserted without a delay, turning off the SR switching device.

Turning off the SR switching device causes the current flowing through the SR switching device to flow through the body diode thereof, and thus through a higher resistance than when the SR switching device is turned on. As a result, the absolute magnitude of the drain voltage $V_D$ increases which causes the value of the drain voltage $V_D$ to decrease below the on threshold voltage $V_{TH.on}$. However, because the negated SR conduction signal SR_COND_N is still de-asserted, the gate signal $V_{GS}$ is not asserted, and as a result the gate control signal G is not asserted and the SR switching device is not turned on.

At a fourth time $t_4$, the drain voltage $V_D$ reaches the SR off detection threshold $V_{HGH}$, and as a result the negated SR conduction signal SR_COND_N is asserted. At some time after the negated SR conduction signal SR_COND_N is asserted, the SR switching device can again be turned on when the drain voltage $V_D$ drops below the on threshold voltage $V_{TH.on}$. The period between the third time $t_3$ and the fourth time $t_4$ is a dead time interval $T_{DEAD}$ wherein spurious turning on of the SR switching device by transients in the drain voltage $V_D$ is prevented.

During a time interval between the second time $t_2$ and the third time $t_3$, a stray inductance of the switching device induces a positive voltage offset across the drain voltage $V_D$ when a secondary side current flowing through the SR switching device decreases. Such a positive voltage offset may increase the drain voltage $V_D$, leading to a premature turn-off of the switching device. When the switching device is turned off prematurely, the secondary side current may flow through the body diode of the switching device instead of through a channel of the switching device, which decreases the efficiency of the SR circuit due to the higher voltage drop of the body diode (that is, the higher resistance) compared to the channel.

In order to keep the dead time interval $T_{DEAD}$ between the third time $t_3$ and the fourth time $t_4$ substantially equal to a target dead time interval, the SR controller 420 adjusts magnitudes of the offset voltage $V_{offset}$ and the off threshold voltage $V_{TH.off}$, resulting in a change in the virtual off threshold voltage $V_{VTH.off}$. This will be explained below with reference to FIGS. 5 and 6.

In addition, a decreasing rate of the secondary side current in a light load condition may be less than that in a heavy load condition, and thus a positive voltage offset due to the stray inductance in the light load condition is less than that in the heavy load condition. As a result, the drain voltage $V_D$ in the light load condition reaches the virtual turn-off threshold voltage $V_{VTH.off}$ at a time later than the drain voltage $V_D$ reaches the same level in the heavy load condition. Because the dead time interval $T_{DEAD}$ between the third time t3 and the fourth time $t_4$ in the light load condition is less than that in the heavy load condition, the dead time interval $T_{DEAD}$ in the light load condition is more likely to be less than the target dead time interval than that in the heavy load condition.

Figure 5:
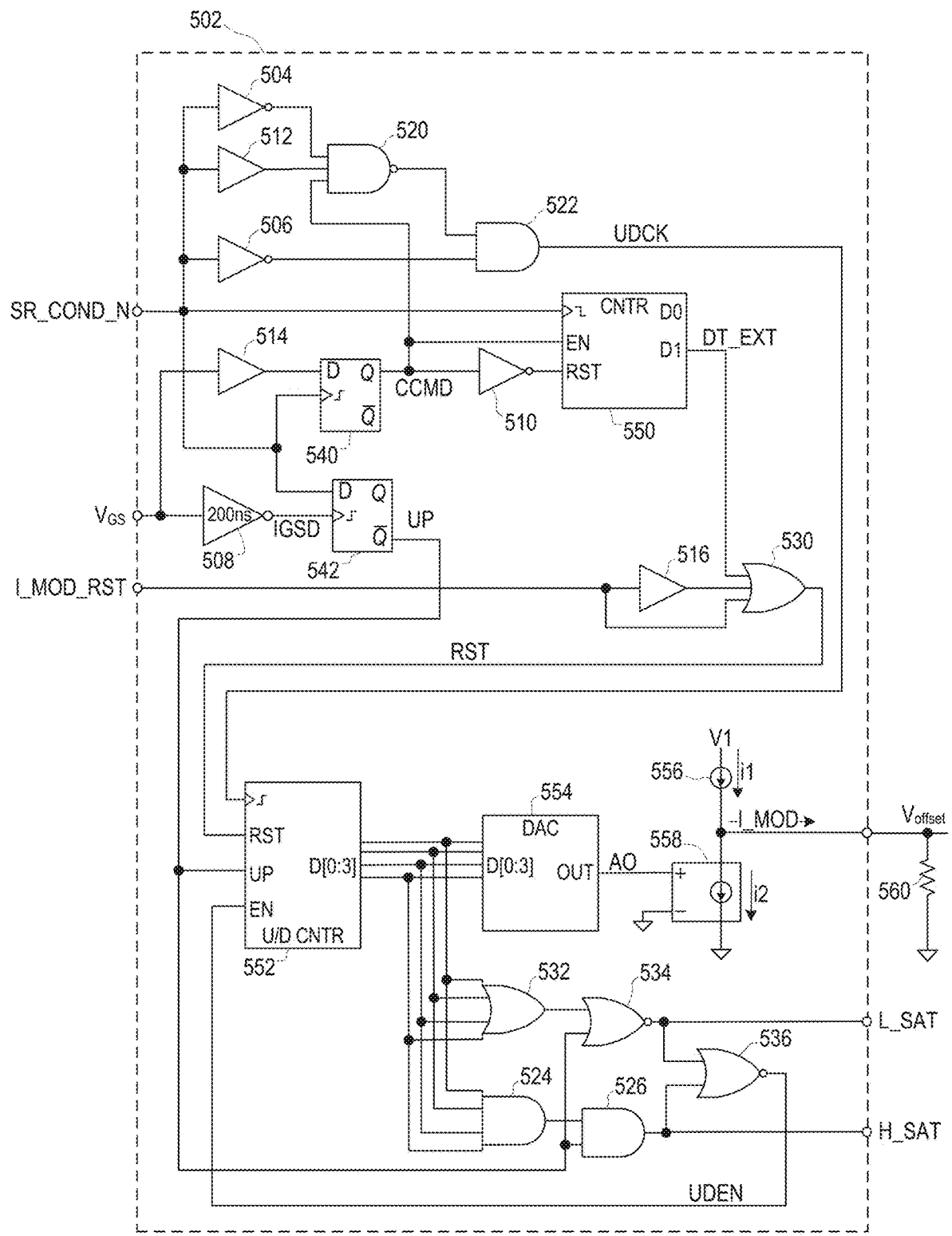
FIG. 5 illustrates an offset voltage controller suitable for use in an SR controller according to an embodiment.

FIG. 5 illustrates an offset voltage controller 502 suitable for use as the offset voltage controller 402 of the SR controller 420 of FIG. 4A according to an embodiment. The offset voltage controller 502 receives a negated SR conduction signal SR_COND_N, a gate signal $V_{GS}$, and an offset reset signal I_MOD_RST. The offset voltage controller 502 uses those signals to produce an offset voltage $V_{offset}$, a low saturation signal L_SAT, and a high saturation signal H_SAT.

The offset voltage controller 502 in FIG. 5 includes first and second inverters 506 and 508; a buffer 516; first and second AND gates 524 and 526; first and second OR gates 530 and 532; first and second NOR gates 534 and 536; and a D-type flip-flop (DFF) 542. The offset voltage controller 502 further includes an up-down counter 552 having 4 bits, a Digital-to-Analog Convert (DAC) 554, a current source 556, and a programmable current source 558. Also shown is an offset resistor 560, which in an embodiment is an external resistor not included in the SR controller 420 of FIG. 4A. In another embodiment, the offset resistor 560 is an internal resistor included in the SR controller 420. Although the embodiment shown in FIG. 5 includes the offset resistor 560 having a terminal connected to ground, but embodiments of the present disclosure are not limited thereto.

The first inverter 506 in FIG. 5 receives the negated SR conduction signal SR_COND_N and inverts it to generate an up-down clock UDCK. The first OR gate 530 in FIG. 5 asserts a reset signal RST when the offset reset signal I_MOD_RST is asserted, and de-asserts the reset signal RST a short delay interval after the offset reset signal I_MOD_RST is de-asserted, the short delay interval corresponding to a delay through the buffer 516 in FIG. 5.

A data input D of the DFF 542 in FIG. 5 receives the negated SR conduction signal SR_COND_N. A positive-edge triggered clock input of the DFF 542 receives an inverted delayed gate signal IGSD produced by the second inverter 508. In an embodiment, the second inverter 508 delays the gate signal $V_{GS}$ by, for example, 200 nanoseconds and inverts it to produce the inverted delayed gate signal IGSD. In an embodiment, the delay introduced by the second inverter 508 corresponds to a target value for the dead time interval $T_{DEAD}$ of FIG. 4B.

The DFF 542 produces a count up signal UP by latching the negated SR conduction signal SR_COND_N on a rising edge of the inverted delayed gate signal IGSD and inverting the latched value. The rising edge of the inverted delayed gate signal IGSD corresponds to a falling edge of the gate signal $V_{GS}$ that occurred 200 nanoseconds before it. The second inverter 508 and DFF 542 in FIG. 5 comprise a dead time evaluation circuit to determine whether a measured dead time is less than a target dead time, the target dead time corresponding to the delay of the second inverter 508.

Accordingly, the count up signal UP will have be set to an asserted value (e.g., a logic high value) if the negated SR conduction signal SR_COND_N has the de-asserted state 200 nanoseconds after a falling edge of the gate signal $V_{GS}$, that is, if the drain voltage $V_D$ has not reached the SR off detection threshold $V_{HGH}$ within 200 nanoseconds of the gate signal $V_{GS}$ being de-asserted. The count up signal UP will be set to a de-asserted value (e.g., a logic low value) if the drain voltage $V_D$ reached the SR off detection threshold $V_{HGH}$ no later than 200 nanoseconds after the gate signal $V_{GS}$ was de-asserted.

The count up signal UP having the asserted value indicates that the dead time interval $T_{DEAD}$ may need to be decreased. The dead time interval $T_{DEAD}$ may be decreased by increasing the virtual off threshold voltage $V_{VTH.off}$. The virtual off threshold voltage $V_{VTH.off}$ may be increased by decreasing the offset voltage $V_{offset}$ or by increasing the off threshold voltage $V_{TH.off}$.

The count up signal UP having the de-asserted value indicates that the dead time interval $T_{DEAD}$ may need to be increased. The dead time interval $T_{DEAD}$ may be increased by decreasing the virtual off threshold voltage $V_{VTH.off}$. The virtual off threshold voltage $V_{VTH.off}$ may be decreased by increasing the offset voltage $V_{offset}$ or by decreasing the off threshold voltage $V_{TH.off}$.

Regarding the up-down counter 552 in FIG. 5, a positive-edge triggered clock input of the up-down counter 552 receives the up-down clock UDCK, a reset input RST of the up-down counter 552 receives the reset signal RST, an UP input of the up-down counter 552 receives the count up signal UP, and an enable input EN of the up-down counter 552 receives an up-down counter enable signal UDEN. The up-down counter 552 produce a 4-bit unsigned count D[0:3] according to the received signals.

When the reset signal RST is asserted, the up-down counter 552 outputs a value of 0 on the unsigned count D[0:3].

When the reset signal RST is de-asserted and the up-down counter enable signal UDEN is de-asserted, the up-down counter 552 maintains the output value of the unsigned count D[0:3] regardless of the values of the count up signal UP and the up-down clock UDCK.

When the reset signal RST is de-asserted, the up-down counter enable signal UDEN is asserted, the count up signal UP is asserted, and a rising edge occurs on the up-down clock UDCK, the up-down counter 552 increases the value of the unsigned count D[0:3] by one.

When the reset signal RST is de-asserted, the up-down counter enable signal UDEN is asserted, the count up signal UP is de-asserted, and a rising edge occurs on the up-down clock UDCK, the up-down counter 452 decreases the value of the unsigned count D[0:3] by one.

The DAC 554 in FIG. 5 receives the unsigned count D[0:3] and generates an analog output signal AO having a value corresponding to the unsigned count D[0:3]. The analog output signal AO is received by the programmable current source 558, which generates a second current $i_2$ proportional to the value of the analog output signal AO. In an embodiment, the second current $i_2$ is represented by the following equation:

$$i_2 = D[0:3] \times 5\mu A \qquad \text{Equation 5.}$$

A first current $i_1$ is generated by the current source 556 in FIG. 5 using a first internal voltage V1. The second current $i_2$ is combined with the first current $i_1$ provided by the current source 556 to produce a modulation current I_MOD, which is represented by the following equation:

$$I\_MOD = i_1 - i_2 = i_1 - (D[0:3] \times 5\mu A) \qquad \text{Equation 6.}$$

In an embodiment, the first current $i_1$ provided by the current source 556 is 75 µA, and the modulation current I_MOD ranges from 75 µA down to 0 µA as the unsigned count D[0:3] ranges from 0 to 15.

The modulation current I_MOD is provided to the offset resistor 560 in FIG. 5 to generate the offset voltage $V_{offset}$. Where $R_{offset}$ represents the resistance of the offset resistor 560, the offset voltage $V_{offset}$ has a value equal to:

$$V_{offset} = I\_MOD \times R_{offset} \qquad \text{Equation 7.}$$

The second OR gate 532 in FIG. 5 produces an output that is de-asserted when the unsigned count D[0:3] is zero (that is, when every bit of the unsigned count D[0:3] is zero) and asserted otherwise. The first NOR gate 534 in FIG. 5 combines the output of the second OR gate 532 with the count up signal UP to produce a low saturation signal L_SAT. The low saturation signal L_SAT is asserted when the unsigned count D[0:3] is zero and the count up signal UP is de-asserted (that is, has a DOWN value), and de-asserted otherwise, thereby indicating saturation of the up-down counter 552 at the lower end of its range.

The first AND gate 524 in FIG. 5 produces an output that is asserted when the unsigned count D[0:3] is at a maximum value (that is, when every bit of D[0:3] is one) and de-asserted otherwise. The second AND gate 526 in FIG. 5 combines the output of the first AND gate 524 with the count up signal UP to produce a high saturation signal H_SAT. The high saturation signal H_SAT is asserted when the unsigned count D[0:3] is at its maximum value and the count up signal UP is asserted (that is, has an UP value), and de-asserted otherwise, thereby indicating saturation of the up-down counter 552 at the upper end of its range.

The second NOR gate 536 in FIG. 5 combines the high saturation signal H_SAT and the low saturation signal L_SAT to produce an up-down counter enable signal UDEN. The up-down counter enable signal UDEN is de-asserted when either of the high saturation signal H_SAT and the low saturation signal L_SAT are asserted. The up-down counter enable signal UDEN is provided to the enable input EN of the up-down counter 552, and operates to prevent the up-down counter 552 from incrementing or decrementing beyond either the minimum or maximum value of the unsigned count D[0:3]. That is, the up-down counter enable signal UDEN prevents the up-down counter 552 from "wrapping around" from the maximum to the minimum value or vice versa.

Figure 6:
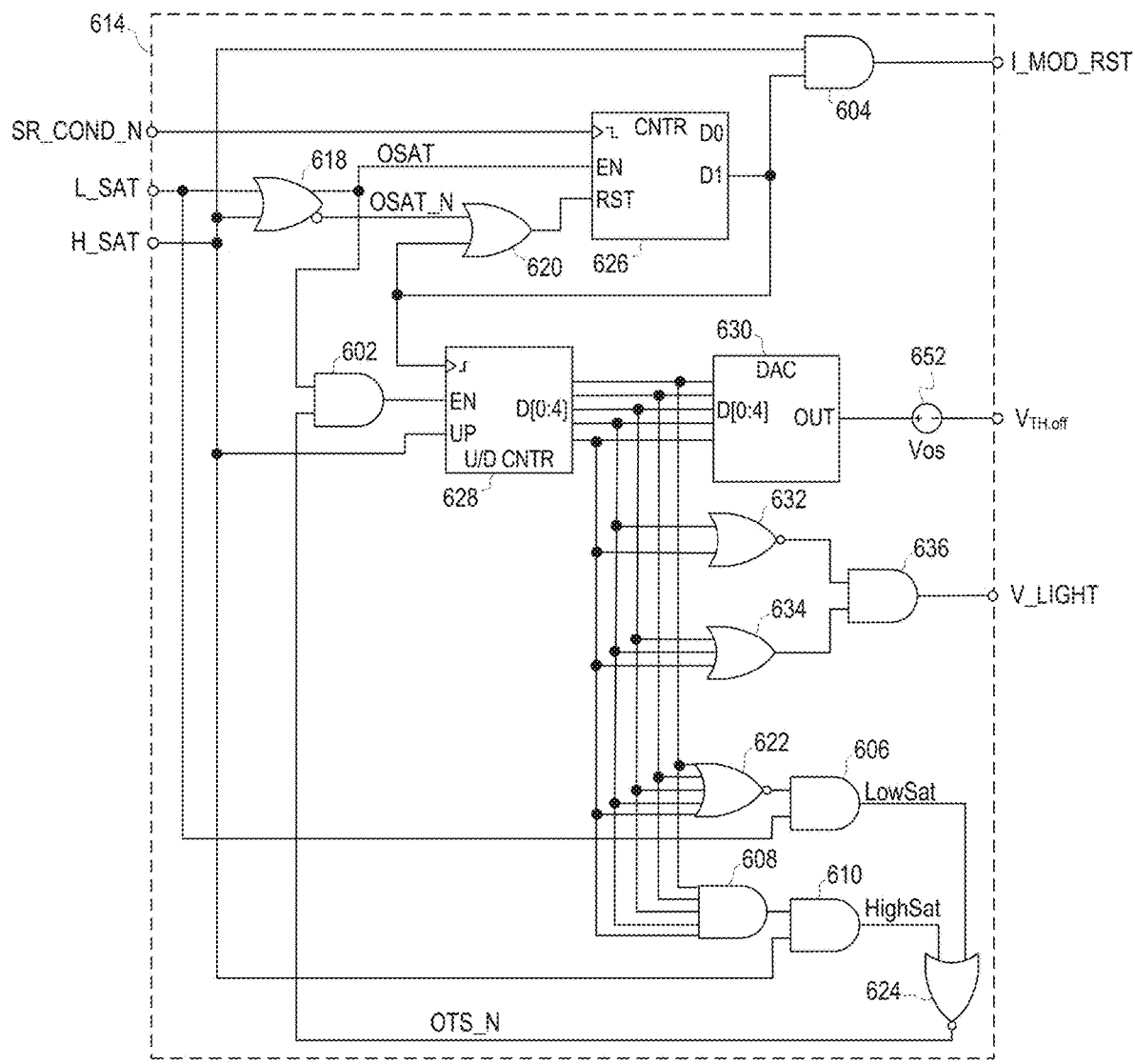
FIG. 6 illustrates an off threshold controller suitable for use in an SR controller according to an embodiment.

FIG. 6 illustrates an off threshold controller 614 suitable for use as the off threshold controller 414 of the SR controller 420 of FIG. 4A according to an embodiment. The off threshold controller 614 receives a negated SR conduction signal SR_COND_N, a low saturation signal L_SAT, and a high saturation signal H_SAT. Using these signals, the off threshold controller 614 generates an off threshold voltage $V_{TH.off}$, an operation mode signal V_LIGHT, and an offset reset signal I_MOD_RST.

The off threshold controller 614 in FIG. 6 includes first, second, third, fourth, fifth, and sixth AND gates 602, 604, 606, 608, 610, and 636; a complementary-output OR gate 618; first and second OR gates 620 and 634, and first, second, and third NOR gates 622, 624, and 632. The off threshold controller 614 further includes a 2-bit counter 626, a 5-bit up-down counter 628, and a Digital-to-Analog Converter (DAC) 630.

The complementary-output OR gate 618 in FIG. 6 receives the low saturation signal L_SAT and the high saturation signal H_SAT. The complementary-output OR gate 618 asserts an offset saturated signal OSAT when either of the low saturation signal L_SAT and the high saturation signal H_SAT are asserted, and de-asserts the offset saturation signal OSAT otherwise. The complementary-output OR gate 618 asserts an offset not saturated signal OSAT_N when neither of the low saturation signal L_SAT and the high saturation signal H_SAT are asserted, and de-asserts the offset not saturated signal OSAT_N otherwise.

An enabled input EN of the counter 626 in FIG. 6 receives the offset saturated signal OSAT. When the offset saturated signal OSAT is asserted and a reset input RST of the counter 626 is not asserted, the counter 626 is incremented in response to a falling edge of the negated SR conduction signal SR_COND_N. When the counter 626 reaches a count of two, a second bit D1 of the counter 626 is asserted.

The second AND gate 604 in FIG. 6 receives the second bit D1 of the counter 626 and the high saturation signal H_SAT. When both the second bit D1 and the high saturation signal H_SAT are asserted, the second AND gate 604 asserts the offset reset signal I_MOD_RST; otherwise, the second AND gate 604 de-asserts the offset reset signal I_MOD_RST. As a result, the offset reset signal I_MOD_RST is asserted when the high saturation signal H_SAT has been asserted for two consecutive negative transitions of the negated SR conduction signal SR_COND_N; that is, for two consecutive cycles of synchronous rectification.

The first OR gate 620 in FIG. 6 receives the offset not saturated signal OSAT_N and the second bit D1 of the counter 626, and provides an output signal to the reset input RST of the counter 626. As a result, the counter 626 is reset when either of the offset not saturated signal OSAT_N and the second bit D1 are asserted.

The first AND gate 602 in FIG. 6 receives the offset saturated signal OSAT and an off threshold not saturated signal OTS_N and provides an output signal to the enable input EN of the up-down counter 628 in FIG. 6. As a result, the up-down counter 628 is enabled when the offset saturated signal OSAT is asserted and the off threshold not saturated signal OTS_N is asserted.

A positive-edge triggered clock input of the up-down counter 628 receives the second bit D1 of the counter 626. The up-down counter 628 therefore counts, either increasing or decreasing a value of an unsigned count D[0:4] of the up-down counter 628, when the up-down counter 628 is enabled and the counter 626 counts to two. When the up-down counter 628 counts, it increases the value of the unsigned count D[0:4] when the high saturation signal H_SAT is asserted and decreases the value of the unsigned count D[0:4] when the high saturation signal H_SAT is not asserted.

The first NOR gate 622 in FIG. 6 produces an output that is asserted when the unsigned count D[0:4] is zero (that is, when every bit of the unsigned count D[0:4] is zero) and de-asserted otherwise. The third AND gate 606 in FIG. 6 combines the output of the first NOR gate 622 with the low saturation signal L_SAT to produce a low threshold saturation signal LowSat. The low threshold saturation signal LowSat is asserted when the unsigned count D[0:4] is zero and the low saturation signal L_SAT is asserted, and de-asserted otherwise, thereby indicating saturation of the up-down counter 628 at the bottom end of its range.

The fourth AND gate 608 in FIG. 6 produces an output that is asserted when the unsigned count D[0:4] is at a maximum value (that is, when every bit of the unsigned count D[0:4] is one) and de-asserted otherwise. The fifth AND gate 610 in FIG. 6 combines the output of the fourth AND gate 608 with the high saturation signal H_SAT to produce a high threshold saturation signal HighSat. The high threshold saturation signal HighSat is asserted when the unsigned count D[0:4] is at its maximum value and the high saturation signal H_SAT is asserted, and de-asserted otherwise, thereby indicating saturation of the up-down counter 628 at the top end of its range.

The second NOR gate 624 in FIG. 6 combines the high threshold saturation signal HighSat and the low threshold saturation signal LowSat to produce the off threshold not saturated signal OTS_N. The off threshold not saturated signal OTS_N is de-asserted when either of the high threshold saturation signal HighSat and the low threshold saturation signal LowSat are asserted. The off threshold not saturated signal OTS_N is used to generate the enable signal for the up-down counter 628, and operates to prevent the up-down counter 628 from incrementing or decrementing beyond either the minimum or maximum value of the unsigned count D[0:4]. That is, the off threshold not saturated signal OTS_N prevents the up-down counter 628 from "wrapping around" from its maximum to its minimum value or vice versa.

The DAC 630 in FIG. 6 receives the unsigned count D[0:4] and generates an output voltage having a value corresponding to the unsigned count D[0:4]. In an embodiment, an output of the DAC 630 is coupled to an offset voltage 652 to produce the off threshold voltage $V_{TH.off}$. The voltage value of the off threshold voltage $V_{TH.off}$ is equal to the output voltage of the DAC 630 minus the voltage value of the offset voltage 652.

The third NOR gate 632 in FIG. 6 produces an output that is asserted when the upper two bits of the unsigned count D[0:4] are zero (that is, when the value represented by the unsigned count D[0:4] is less than 8) and de-asserted otherwise. The second OR gate 634 in FIG. 6 produces an output that is de-asserted when the upper three bits of the unsigned count D[0:4] are zero and asserted otherwise (that is, when the value represented by the unsigned count D[0:4] is greater than or equal to 4). The sixth AND gate 636 in FIG. 6 combines the output of the third NOR gate 632 with the output of the second OR gate 634 to produce the operation mode signal V_LIGHT, which is asserted when the value represented by the unsigned count D[0:4] is less than 8 and greater than or equal to 4. The third NOR gate 632, the second OR gate 634, and the sixth AND gate 636 together function as an operation mode signal circuit, which generates the operation mode signal V_LIGHT according to the off threshold voltage $V_{TH.off}$.

For example, when the output voltage of the DAC 630 has a range of 0 to 248 mV corresponding to a range of the unsigned count D[0:4] of 0 to 31 and the offset voltage $V_{OS}$ is has an absolute value of 30 mV, the off threshold voltage $V_{TH.off}$ has a range of −30 mV to 218 mV, the operation mode signal V_LIGHT is asserted when the off threshold voltage $V_{TH.off}$ has a value (e.g., +2 mV corresponding to the unsigned count D[0:4] of 4) that is positive and less than a given value (e.g., +34 mV corresponding to the unsigned count D[0:4] of 8), and de-asserted otherwise.

When a flyback converter (e.g., the flyback converter 200 in FIG. 2) operates in CCM, current flowing through an SR switching device (e.g., the SR switching device 222 in FIG. 2) has a relatively large magnitude at a time when a gate control signal is de-asserted (e.g., the gate control signal G being de-asserted at $t_3$ in FIG. 4B). At that time, a drain voltage $V_D$ (e.g., $V_D$ in FIG. 4B) is determined by a product of a turn-on resistance $R_{DS.ON}$ of the SR switching device and a magnitude $I_{SR}$ of the current as follows:

$$V_D = -R_{DS.ON} * I_{SR} \qquad \text{Equation 8.}$$

Thus, the drain voltage is likely to have a negative value, and the off threshold voltage $V_{TH.off}$ is likely to have a negative value in order to keep a dead time interval (e.g. $T_{DEAD}$ in FIG. 4B) substantially equal to a target dead time interval. When the value of the off threshold voltage $V_{TH.off}$ is negative, the operation mode signal V_LIGHT is de-asserted.

When the flyback converter operates in CCM, the flyback converter may not operate in a light load condition even when one or both of a duty cycle and an on-time duration of an SR conduction signal (e.g., the SR conduction signal SR_COND in FIG. 4A) is relatively short. On the other hand, the value of the off threshold voltage $V_{TH.off}$ being positive and the operation mode signal V_LIGHT having an asserted value (e.g., a logic high value) may indicate that the flyback converter is operating in a mode other than CCM (such as a CRM or DCM).

When the flyback converter operates in CRM or DCM, the flyback converter is likely to operate in the light load condition when one or both of the duty cycle and the on-time duration of an SR conduction signal is relatively short. Thus, the operation mode signal V_LIGHT being asserted can be used with a signal indicating one of the duty cycle and the on-time duration of the SR conduction signal to determine whether the flyback converter operates in the light load condition.

When an LLC power converter (e.g., the power converter 300 in FIG. 3) operates in an above resonance mode and heavy load condition, current conducting through an SR switching device (e.g., the SR switching device 322-1 or 322-2 in FIG. 3) has a relatively large magnitude at a time when a gate control signal is de-asserted (e.g., the gate control signal G being de-asserted at $t_3$ in FIG. 4B). Thus, a drain voltage (e.g., $V_D$ in FIG. 4B) at that time is likely to have a negative value, and the off threshold voltage $V_{TH.off}$ is likely to have a negative value to keep a dead time interval substantially equal to a target dead time interval. When the value of the off threshold voltage $V_{TH.off}$ is negative, the operation mode signal V_LIGHT is de-asserted.

When the LLC converter operates in the above resonance mode, the LLC converter may not operate in a light load condition although a period of an SR conduction signal is relatively short. On the other hand, when the off threshold voltage $V_{TH.off}$ has a positive value and the operation mode signal V_LIGHT has an asserted value (e.g., a logic high value), the LLC converter is likely to operate in a mode (e.g., a below resonance mode) other than the above resonance mode.

When the LLC converter operates in the below resonance mode, the LLC converter is likely to operate in the light load condition when the period of an SR conduction signal is relatively short. Thus, the operation mode signal V_LIGHT being asserted can be used with a signal indicating the period of the SR conduction signal to determine whether the LLC converter operates in the light load condition.

Figure 7A:
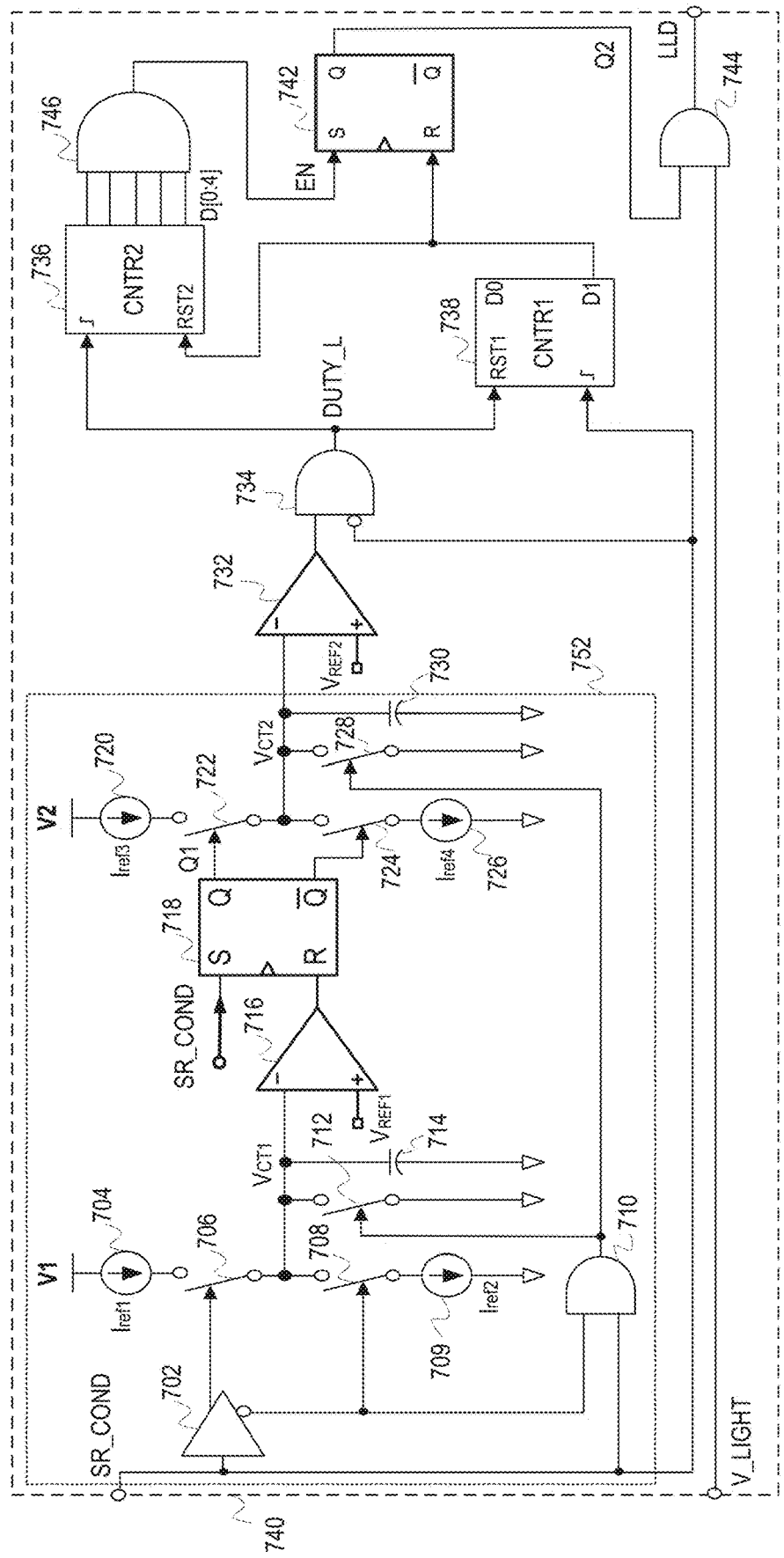
FIG. 7A illustrates a light load detection (LLD) circuit suitable for use in an SR controller according to an embodiment.

FIG. 7A illustrates an LLD circuit 740 suitable for use as the LLD circuit 440 of the SR controller 420 of FIG. 4A according to an embodiment. The LLD circuit 740 receives a SR conduction signal SR_COND and an operation mode signal V_LIGHT. Using these signals, the LLD circuit 740 generates a light load detection signal LLD.

The LLD circuit 740 in FIG. 7A includes a duty calculator 752, which includes a buffer 702, first, second, third, and fourth current sources 704, 709, 720, and 726, first, second, and third switching devices 706, 708, 712, first and second capacitors 714 and 730, a first SRFF 718, and a first AND gate 710. The LLD circuit 740 further includes a second comparator 732, second, third, and fourth AND gates 734, 746, and 744, first and second up counters 738 and 736, and a second SRFF 742.

The buffer 702 in FIG. 7A receives the SR conduction signal SR_COND, and generates a delayed version of the SR conduction signal SR_COND and an inverted (and delayed) version of the SR conduction signal SR_COND. The first switching device 706 in FIG. 7A receives the delayed version of the SR conduction signal SR_COND and is turned on a given delay interval after the SR conduction signal SR_COND is asserted. When the first switching device 706 is turned on, the first current source 704 is coupled to the first capacitor 714, thereby increasing a value of a first intermediate voltage $V_{CT1}$.

The second switching device 708 in FIG. 7A receives the inverted version of the SR conduction signal SR_COND and is turned on after the SR conduction signal SR_COND is de-asserted. When the second switching device 708 is turned on, the second current source 709 is coupled to the first capacitor 714, thereby decreasing the value of the first intermediate voltage $V_{CT1}$. In an embodiment, a magnitude of $I_{ref1}$ of the first current source 704 is substantially equal to a magnitude $I_{ref2}$ of the second current source 709.

The first AND gate 710 receives the SR conduction signal SR_COND and the inverted version of the SR conduction signal SR_COND, and has an output that is asserted when both received signals are asserted and de-asserted otherwise. As a result, the first AND gate 710 asserts its output in response to a rising edge (that is, a transition from de-asserted to asserted) of the SR conduction signal SR_COND, the output being a pulse asserted for an interval corresponding to a delay through the buffer 702.

The output of the first AND gate 710 controls the third switching device 712. The third switching device 712 is connected across the first capacitor 714. When the first AND gate 710 outputs a pulse in response to a rising edge of the SR conduction signal SR_COND, the third switching device 712 turns on for a duration corresponding to the delay through the buffer 702, discharging the first capacitor 714 and setting the value of the first intermediate voltage $V_{CT1}$ to 0 volts.

The first comparator 716 in FIG. 7A has an inverting input receiving the first intermediate voltage $V_{CT1}$ and a non-inverting input receiving a first reference voltage $V_{REF1}$. The first reference voltage $V_{REF1}$ has a value proximate to 0V, for example, 100 mV. The first comparator 716 asserts an output signal in response to the first intermediate voltage $V_{CT1}$ being less than the first reference voltage $V_{REF1}$.

The first SRFF 718 in FIG. 7A sets a first output signal Q1 to an asserted value (e.g., a logic high value) in response to the SR conduction signal SR_COND being asserted. The first SRFF 718 resets the first output signal Q1 to a de-asserted value (e.g., a logic low value) in response to the output signal of the first comparator 716. When neither of these conditions is true, the first SRFF 718 maintains the first output signal Q1 in its current state.

The fourth switching device 722 in FIG. 7A receives the first output signal Q1 and is turned on when the first output signal Q1 has the asserted value. When the fourth switching device 722 is turned on, the third current source 720 is coupled to the second capacitor 730, thereby increasing a value of a second intermediate voltage $V_{CT2}$.

The fifth switching device 724 in FIG. 7A receives an inverted version of the first output signal Q1 and is turned on when the inverted version of the first output signal Q1 has an asserted value (e.g., a logic high value). When the fifth switching device 724 is turned on, the fourth current source 726 is coupled to the second capacitor 730, thereby decreasing the value of the second intermediate voltage $V_{CT2}$. In an embodiment, a magnitude of $I_{ref3}$ of the third current source 720 is substantially equal to a magnitude $I_{ref4}$ of the fourth current source 726.

The second comparator 732 in FIG. 7A has an inverting input receiving the second intermediate voltage $V_{CT2}$ and a non-inverting input receiving a second reference voltage $V_{REF2}$. The second reference voltage $V_{REF2}$ has a value proximate to 0V, for example, 100 mV. The second comparator 732 asserts an output signal in response to the second intermediate voltage $V_{CT2}$ being less than the second reference voltage $V_{REF2}$.

The second AND gate 734 in FIG. 7A receives the output signal of the second comparator 734 and an inverted version of the SR conduction signal SR_COND. The second AND gate 734 asserts a duty signal (or a low duty signal) DUTY_L when the output signal of the second comparator 734 is asserted and the inverted version of the SR conduction signal SR_COND is asserted, and is de-asserted otherwise.

The first up counter 738 in FIG. 7A has a positive-edge triggered clock input receiving the SR conduction signal SR_COND and a reset input RST1 receiving the duty signal DUTY_L. When the first up counter 738 produces a count of two, a second bit D1 of the first up counter 738 is asserted.

The second up counter 736 in FIG. 7A has a positive-edge triggered clock input receiving the duty signal DUTY_L and a reset input RST2 receiving the second bit D1 of the first up counter 738. The second up counter 736 generates an unsigned count D[0:4] using the received signals.

The third AND gate 746 in FIG. 7A receives the unsigned count D[0:4]. The third AND gate produces an output signal EN that is asserted when the unsigned count D[0:4] is at a maximum value (that is, when every bit of the unsigned count D[0:4] is one) and de-asserted otherwise.

The second SRFF 742 in FIG. 7A sets a second output signal Q2 to an asserted value (e.g., a logic high value) in response to the output signal EN of the third AND gate 746 being asserted. The second SRFF 742 resets the second output signal Q2 to a de-asserted value (e.g., a logic low value) in response to the second bit D1 of the first up counter 738. When neither of these conditions is true, the second SRFF 742 maintains the second output signal Q2 in its current state.

The fourth AND gate 744 in FIG. 7A receives the second output signal Q2 and the operation mode signal V_LIGHT. The fourth AND gate 744 combines the second output signal Q2 with the operation mode signal V_LIGHT to produce the light load detection signal LLD.

Figure 7B:
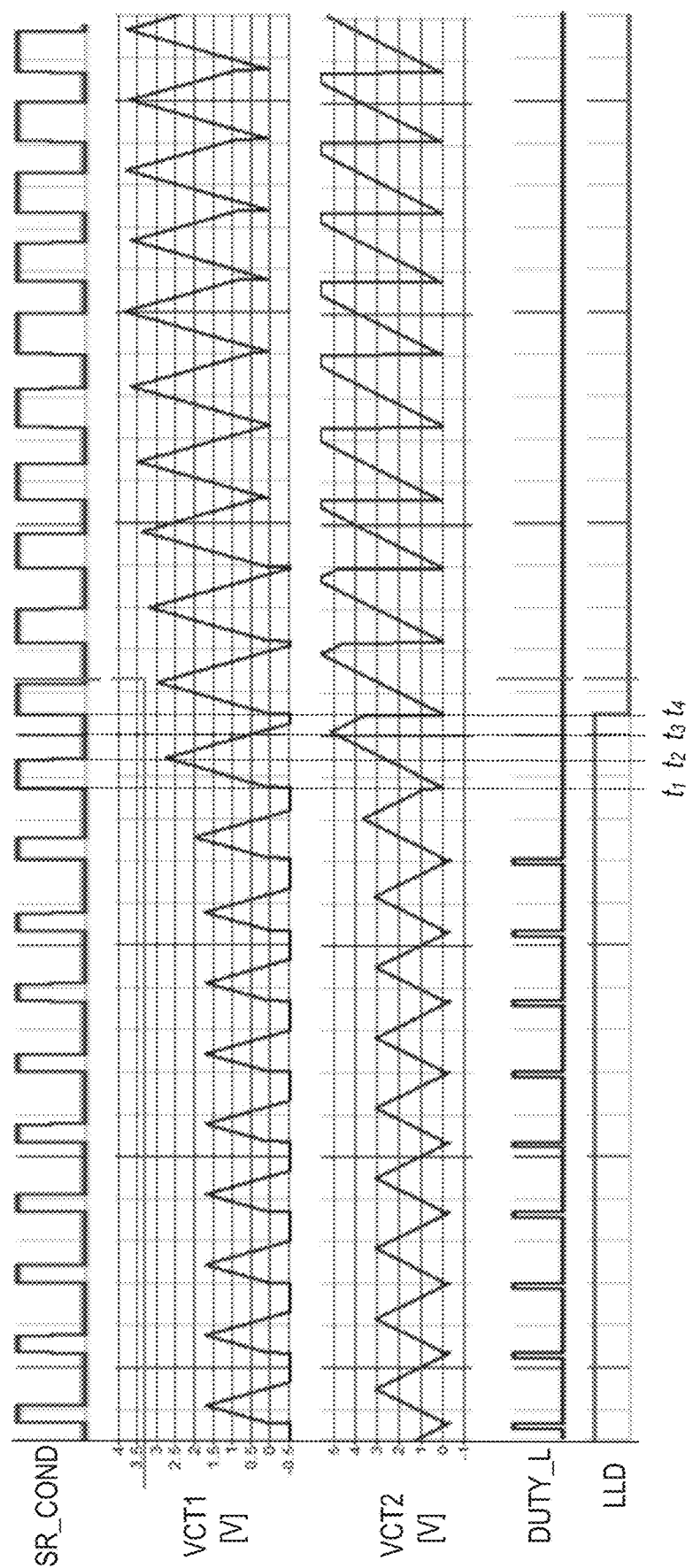
FIG. 7B includes waveforms illustrating operation of the LLD circuit of FIG. 7A according to an embodiment.

FIG. 7B includes waveforms illustrating operation during a period when the light load detection signal LLD transitions from an asserted value (e.g., a logic high value) to a de-asserted value (e.g., a logic low value) according to an embodiment. FIG. 7B includes waveforms of the SR conduction signal SR_COND, the first intermediate voltage $V_{CT1}$, the second intermediate voltage $V_{CT2}$, the duty signal DUTY_L, and the light load detection signal LLD. The operation mode signal V_LIGHT (not shown) is asserted during the period illustrated in FIG. 7B.

Before a first time $t_1$, the light load detection signal LLD has been asserted. In an embodiment shown in FIG. 7A, assuming that the magnitudes of the first, second, third, and fourth currents $I_{ref1}$, $I_{ref2}$, $I_{ref3}$, and $I_{ref4}$ are substantially equal to each other and the values of the first and second reference voltages $V_{REF1}$ and $V_{REF2}$ are proximate to 0V, if a duty cycle of the SR conduction signal SR_COND is substantially equal to or less than 0.25, the duty signal DUTY_L would be asserted during a time interval when the second intermediate voltage $V_{CT2}$ is less than the second reference voltage $V_{REF2}$ and the SR conduction signal SR_COND is de-asserted. When the duty signal DUTY_L is repeatedly asserted for a given number of times (e.g., 32 times for the second up counter 736 in FIG. 7A), the second up counter 736 generates the maximum value of the unsigned count D[0:4], thereby causing the light load detection signal LLD to transition from the de-asserted value to the asserted value.

At the first time $t_1$, the SR conduction signal SR_COND is asserted and the duty cycle of the SR conduction signal SR_COND becomes greater than a given ratio (e.g., 0.25). The second intermediate voltage $V_{CT2}$ is greater than the second reference voltage $V_{REF2}$ at the first time $t_1$, and thus the duty signal DUTY_L is not asserted. The first switching device 706 in FIG. 7A is turned on, and thus the first intermediate voltage $V_{CT1}$, after being reset to zero by the third switching device 712 in response to the rising edge of the SR conduction signal SR_COND, starts to increase until the SR conduction signal SR_COND is de-asserted at a second time $t_2$. When the first intermediate voltage $V_{CT1}$ exceeds the first reference voltage $V_{REF1}$ and the SR conduction signal SR_COND is asserted, the fourth switching device 722 in FIG. 7A is turned on, and thus the second intermediate voltage $V_{CT2}$ also starts to increase.

At the second time $t_2$, the SR conduction signal SR_COND is de-asserted. As a result, the first switching device 706 in FIG. 7A is turned off and the second switching device 708 in FIG. 7A is turned on, and thus the first intermediate voltage $V_{CT1}$ starts to decrease.

At a third time $t_3$, the first intermediate voltage $V_{CT1}$ becomes less than the first reference voltage $V_{REF1}$ and the SR conduction signal SR_COND has a de-asserted value. As a result, the fifth switching device 724 is turned on, and thus the second intermediate voltage $V_{CT2}$ starts to decrease.

At a fourth time $t_4$, the SR conduction signal SR_COND is asserted again. Because the duty cycle of the SR conduction signal SR_COND is greater than 0.25, the second intermediate voltage $V_{CT2}$ is greater than the second reference voltage $V_{REF2}$ at the fourth time $t_4$, and thus the duty signal DUTY_L is not asserted. Because the duty signal DUTY_L remains de-asserted while the first up counter 738 in FIG. 7A receives two positive edges of the SR conduction signal SR_COND, the second bit D1 of the first up counter 738 in FIG. 7A is asserted, thereby resetting the second SRFF 742. As a result, the fourth AND circuit 744 in FIG. 7A receives the second output signal Q2 having a de-asserted value from the second SRFF 742 and generates the light load detection signal LLD having a de-asserted value regardless of the value of the operation mode signal V_LIGHT.

Figure 8:
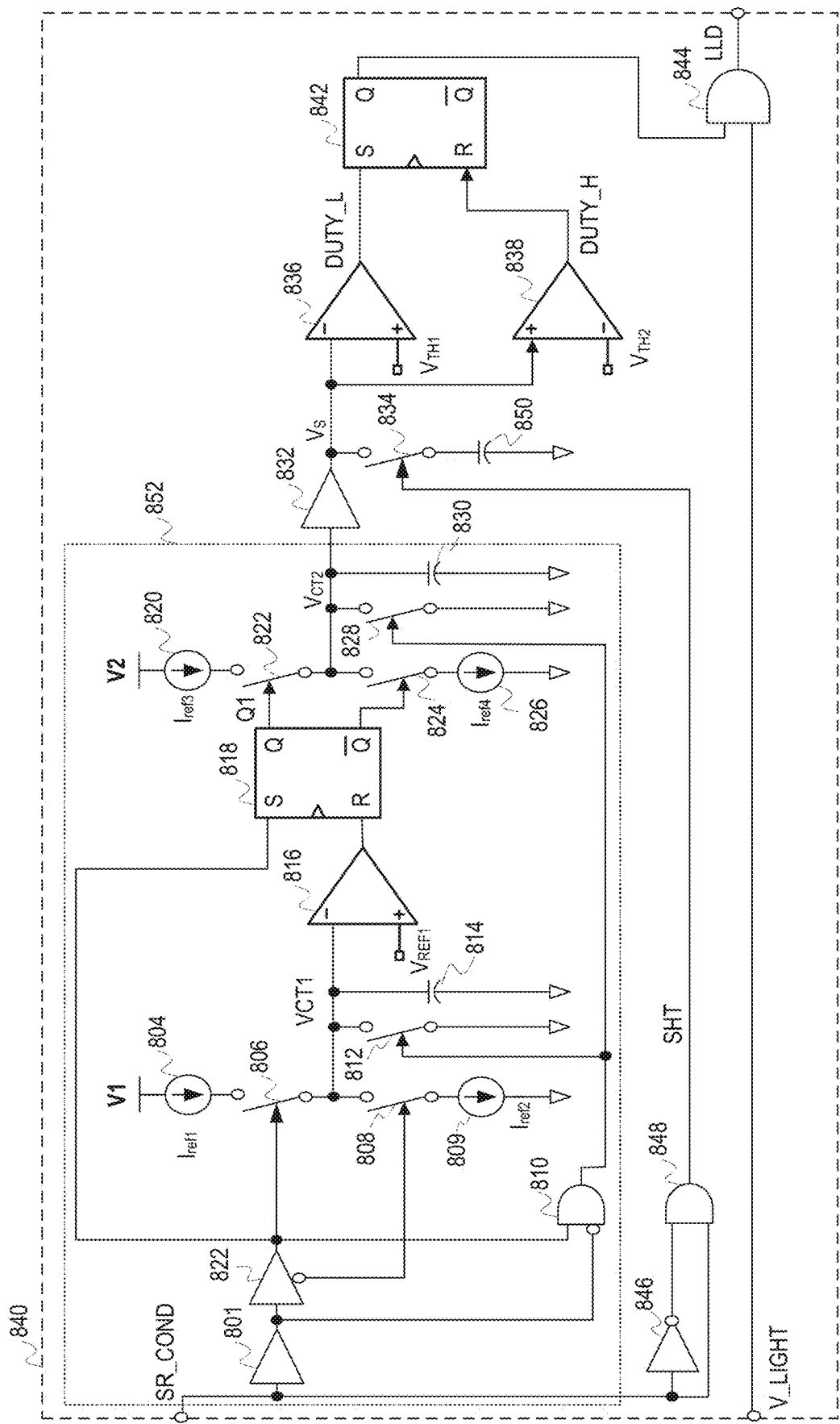
FIG. 8 illustrates a light load detection (LLD) circuit suitable for use in an SR controller according to an embodiment.

FIG. 8 illustrates an LLD circuit 840 suitable for use as the LLD circuit 440 of the SR controller 420 of FIG. 4A according to an embodiment. The LLD circuit 840 receives a SR conduction signal SR_COND and an operation mode signal V_LIGHT. Using these signals, the LLD circuit 840 generates a light load detection signal LLD.

Like the LLD circuit 740 in FIG. 7A, the LLD circuit 840 includes a duty calculator 852, which includes first, second, third, and fourth current sources 804, 809, 820, and 826, first, second, and third switching devices 806, 808, and 812, a comparator 816, first and second capacitors 814 and 830, a first SRFF 818, and a first AND gate 810. Like the LLD circuit 740 in FIG. 7A, the LLD circuit 840 further includes a first comparator 836, a second AND gate 844, and a second SRFF 842. Some elements designated by references characters of the form "8xx" in FIG. 8 correspond to like-numbered elements of the form "7xx" in FIG. 7A according to an embodiment, and operate in an analogous manner as was described with respect to FIG. 7A.

Unlike the LLD circuit 740 in FIG. 7A, the LLD circuit 840 in FIG. 8 includes a first buffer 801, an inverter 846, an AND gate 848, a second buffer 832, a switching device 834, a capacitor 850, and first and second comparators 836 and 838.

The inverter 846 and the AND gate 848 in FIG. 8 generates a sample-and-hold triggering signal SHT. The sample-and-hold triggering signal SHT is asserted in response to a rising edge of the SR conduction signal SR_COND and has a pulse width corresponding to a given delay interval (e.g., 10 ns) through the inverter 846.

The switching device 834 and the capacitor 850 in FIG. 8 together function as a sample-and-hold circuit in response to the sample-and-hold triggering signal SHT. That is, the switching device 834 and the capacitor 850 samples a value of an intermediate signal (e.g., an intermediate voltage) $V_{CT2}$ buffered by the second buffer 832 at a time (e.g., the fourth time $t_4$ in FIG. 7B) when the sample-and-hold triggering signal SHT is asserted and provides the sampled value to the first and second comparators 836 and 838.

The first comparator 836 in FIG. 8 has an inverting input receiving a sampled signal (e.g., a sampled voltage) $V_S$ corresponding to the sampled value and a non-inverting input receiving a first threshold voltage V-mi. The first comparator 836 asserts a low duty signal DUTY_L in response to the sampled voltage $V_S$ being less than the first threshold voltage $V_{TH1}$.

The second comparator 838 in FIG. 8 has a non-inverting input receiving the sampled voltage $V_S$ and an inverting input receiving a second threshold voltage $V_{TH2}$. The second comparator 838 asserts a high duty signal DUTY_H in response to the sampled voltage $V_S$ being greater than the second threshold voltage $V_{TH2}$, thereby resetting an SRFF 842 and de-asserting the light load detection signal LLD regardless of a value of the operation mode signal V_LIGHT.

Other operations of the LLD circuit 840 in FIG. 8 are similar to those of the LLD circuit 740 of FIG. 7A. Therefore, detailed descriptions of these operations of the LLD circuit 840 will be omitted herein for the interest of brevity.

Figure 9:
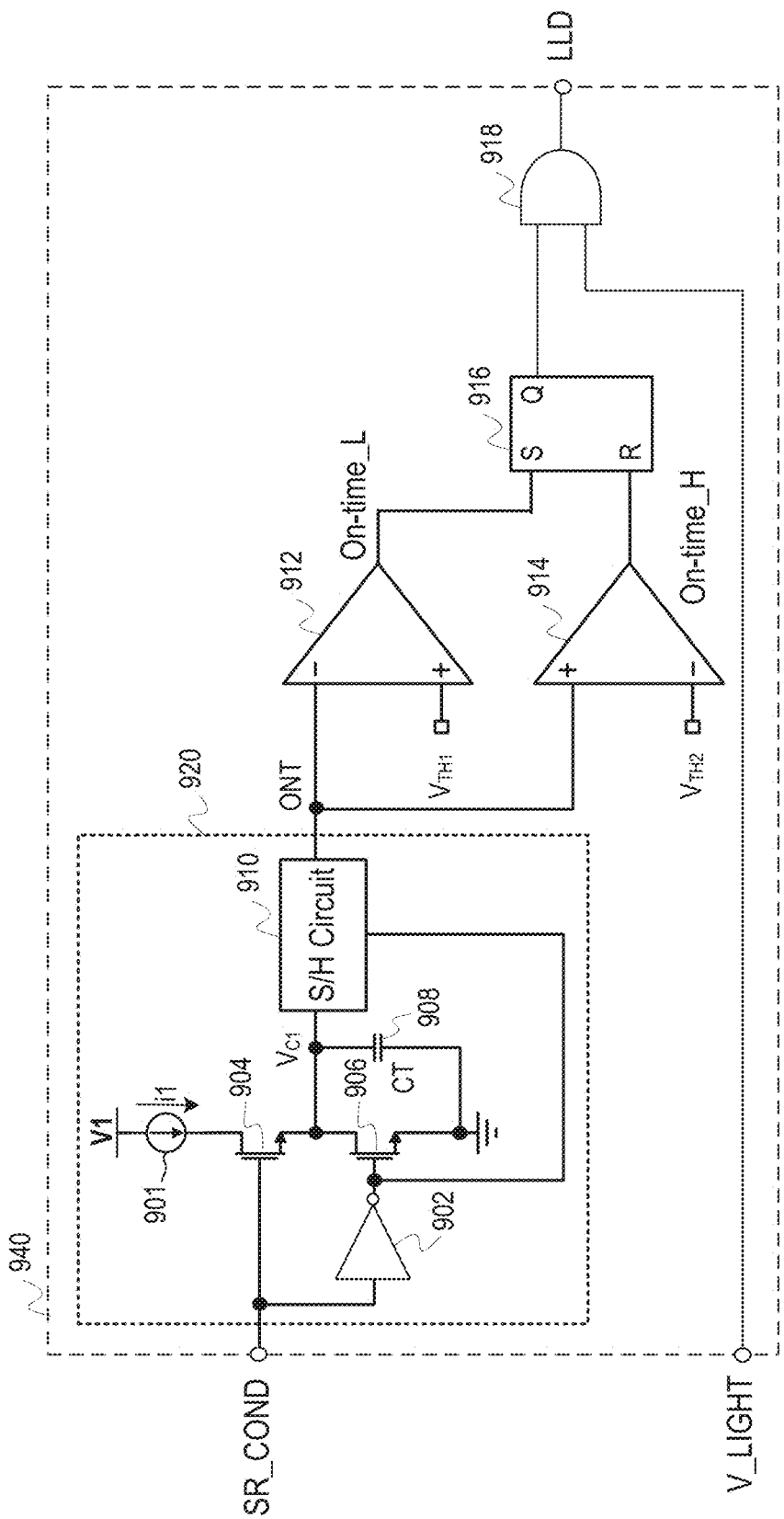
FIG. 9 illustrates a light load detection (LLD) circuit suitable for use in an SR controller according to an embodiment.

FIG. 9 illustrates an LLD circuit 940 suitable for use as the LLD circuit 440 of the SR controller 420 of FIG. 4A according to an embodiment. The LLD circuit 940 receives an SR conduction signal SR_COND and an operation mode signal V_LIGHT. Using these signals, the LLD circuit 940 generates a light load detection signal LLD.

The LLD circuit 940 in FIG. 9 includes an on-time calculator 920, first and second comparators 912 and 914, an SRFF 916, and an AND gate 918. The on-time calculator 920 in FIG. 9 includes an inverter 902, a current source 901 providing current from an internal voltage V1, first and second switching devices 904 and 906, a capacitor 908, and a sample-and-hold circuit 910.

The first switching device 904 in FIG. 9 receives the SR conduction signal SR_COND and is turned on when the SR conduction signal SR_COND is asserted. When the first switching device 904 is turned on, the a current i1 produced by the current source 901 is provided to the capacitor 908, thereby increasing a value of an intermediate voltage $V_{C1}$ at a rate proportional to the magnitude of the current i1 and inversely proportional to the capacitance of the capacitor 908.

The second switching device 906 in FIG. 9 receives an inverted and delayed version of the SR conduction signal SR_COND and is turned on after the SR conduction signal SR_COND is de-asserted. When the second switching device 906 is turned on, the capacitor 908 is coupled to ground, thereby resetting the value of the intermediate voltage $V_{C1}$ to 0V.

The sample-and-hold circuit 910 in FIG. 9 samples the value of the intermediate voltage $V_{C1}$ in response to the SR conduction signal SR_COND being de-asserted and before the second switching device 906 is turned on, and provides an on-time signal ONT indicating the sampled value to the first and second comparators 912 and 914. The on-time signal ONT has a value proportional to an amount of a time interval when the current i1 was provided to the capacitor 908 and the SR conduction signal SR_COND was asserted, and indicates an on-time duration of the SR conduction signal SR_COND.

The first comparator 912 in FIG. 9 has an inverting input receiving the on-time signal ONT and a non-inverting input receiving a first threshold voltage $V_{TH1}$. The first comparator 912 asserts a low on-time signal On-time_L in response to the on-time signal ONT being less than the first threshold voltage $V_{TH1}$.

The second comparator 914 in FIG. 9 has an inverting input receiving a second threshold voltage $V_{TH2}$ and a non-inverting input receiving the on-time signal ONT. The second comparator 914 asserts a high on-time signal On-time_H in response to the on-time signal ONT being greater than the second threshold voltage $V_{TH2}$. In an embodiment, the second threshold voltage $V_{TH2}$ has a value greater than the first threshold voltage $V_{TH1}$.

The SRFF 916 in FIG. 9 sets an output signal Q to an asserted value (e.g., a logic high value) in response to the low on-time signal On-time_L being asserted. The SRFF 916 resets the output signal Q to a de-asserted value (e.g., a logic low value) in response to the high on-time signal On-time_H being asserted.

The AND gate 918 in FIG. 9 receives the output signal Q and the operation mode signal V_LIGHT. The AND gate 918 combines the output signal Q with the operation mode signal V_LIGHT to produce the light load detection signal LLD. When the on-time signal ONT has a value less than the first threshold voltage $V_{TH1}$ and the operation mode signal V_LIGHT has an asserted value (e.g., a logic high value), the AND gate 918 asserts the light load detection signal LLD. When the on-time signal ONT has a value greater than the second threshold voltage $V_{TH2}$, the AND gate 918 generates the light load detection signal LLD having a de-asserted value (e.g., a logic low value) regardless of the value of the operation mode signal V_LIGHT.

Figure 10:
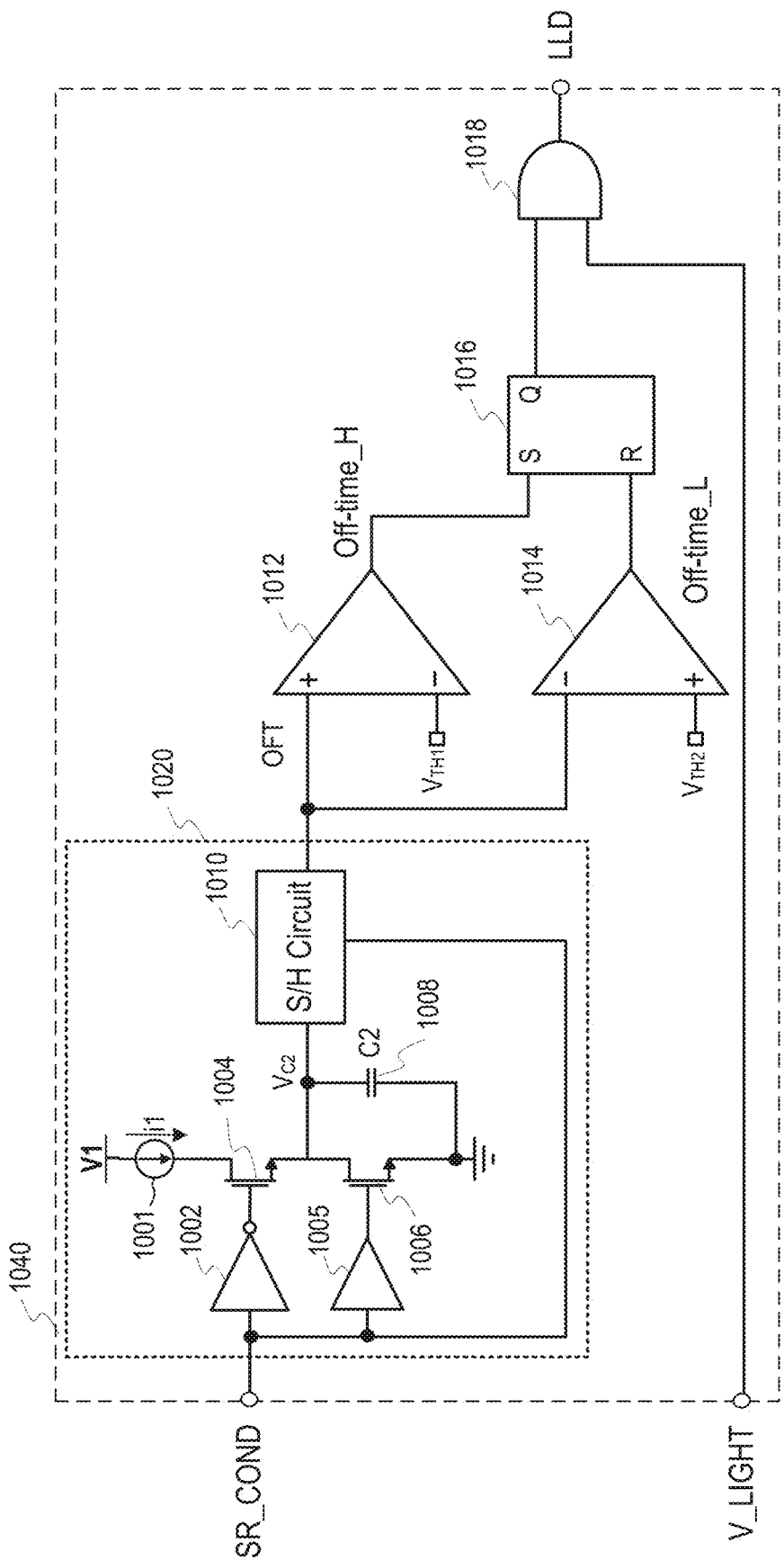
FIG. 10 illustrates a light load detection (LLD) circuit suitable for use in an SR controller according to an embodiment.

FIG. 10 illustrates an LLD circuit 1040 suitable for use as the LLD circuit 440 of the SR controller 420 of FIG. 4A according to an embodiment. The LLD circuit 1040 receives a SR conduction signal SR_COND and an operation mode signal V_LIGHT. Using these signals, the LLD circuit 1040 generates a light load detection signal LLD.

The LLD circuit 1040 in FIG. 10 includes an off-time calculator 1020, first and second comparators 1012 and 1014, an SRFF 1016, and an AND gate 1018. The off-time calculator 1020 in FIG. 10 includes an inverter 1002, a current source 1001 providing current from an internal voltage V1, first and second switching devices 1004 and 1006, a buffer 1005, a capacitor 1008, and a sample-and-hold circuit 1010.

The first switching device 1004 in FIG. 10 receives an inverted version of the SR conduction signal SR_COND from the inverter 1002 and is turned on a given delay interval after the SR conduction signal SR_COND is de-asserted, the given delay interval corresponding to a delay through the inverter 1002. When the first switching device 1004 is turned on, a current i1 produced by the current source 1001 is provided to the capacitor 1008, thereby increasing a value of an intermediate voltage $V_{C2}$ at a rate proportional to the magnitude of the current i1 and inversely proportional to the capacitance of the capacitor 1008.

The second switching device 1006 in FIG. 10 receives the SR conduction signal SR_COND delayed by the buffer 1005 and is turned on when the delayed SR conduction signal SR_COND is asserted. When the second switching device 1006 is turned on, the capacitor 1008 is coupled to ground, thereby resetting the value of the intermediate voltage $V_{C2}$ to 0V.

The sample-and-hold circuit 1010 in FIG. 10 samples the value of the intermediate voltage $V_{C2}$ in response to the SR conduction signal SR_COND being asserted and before the second switching device 1006 is turned on, and provides an off-time signal OFT indicating the sampled value to the first and second comparators 1012 and 1014. The off-time signal OFT has a value proportional to an amount of a time interval when the current it was provided to the capacitor 1008 and the SR conduction signal SR_COND was de-asserted and indicates an off-time duration of the SR conduction signal SR_COND.

The first comparator 1012 in FIG. 10 has a non-inverting input receiving the off-time signal OFT and an inverting input receiving a first threshold voltage $V_{TH1}$. The first comparator 1012 asserts a high off-time signal Off-time_H in response to the off-time signal OFT being greater than the first threshold voltage $V_{TH1}$.

The second comparator 1014 in FIG. 10 has an inverting input receiving the off-time signal OFT and a non-inverting input receiving a second threshold voltage $V_{TH2}$. The second comparator 1014 asserts a low off-time signal Off-time_L in response to the off-time signal OFT being less than the second threshold voltage $V_{TH2}$. In an embodiment, the second threshold voltage $V_{TH2}$ has a value less than the first threshold voltage $V_{TH1}$.

The SRFF 1016 in FIG. 10 sets an output signal Q to an asserted value (e.g., a logic high value) in response to the high off-time signal Off-time_H being asserted. The SRFF 1016 resets the output signal Q to a de-asserted value (e.g., a logic low value) in response to the low off-time signal On-time_L being asserted.

The AND gate 1018 in FIG. 10 receives the output signal Q and the operation mode signal V_LIGHT. The AND gate 1018 combines the output signal Q with the operation mode signal V_LIGHT to produce the light load detection signal LLD. When the off-time signal OFT has a value greater than the first threshold voltage $V_{TH1}$ and the operation mode signal V_LIGHT has an asserted value (e.g., a logic high value), the AND gate 1018 asserts the light load detection signal LLD. When the off-time signal OFT has a value less than the second threshold voltage $V_{TH2}$, the AND gate 1018 generates the light load detection signal LLD having a de-asserted value (e.g., a logic low value) regardless of the value of the operation mode signal V_LIGHT.

Figure 11A:
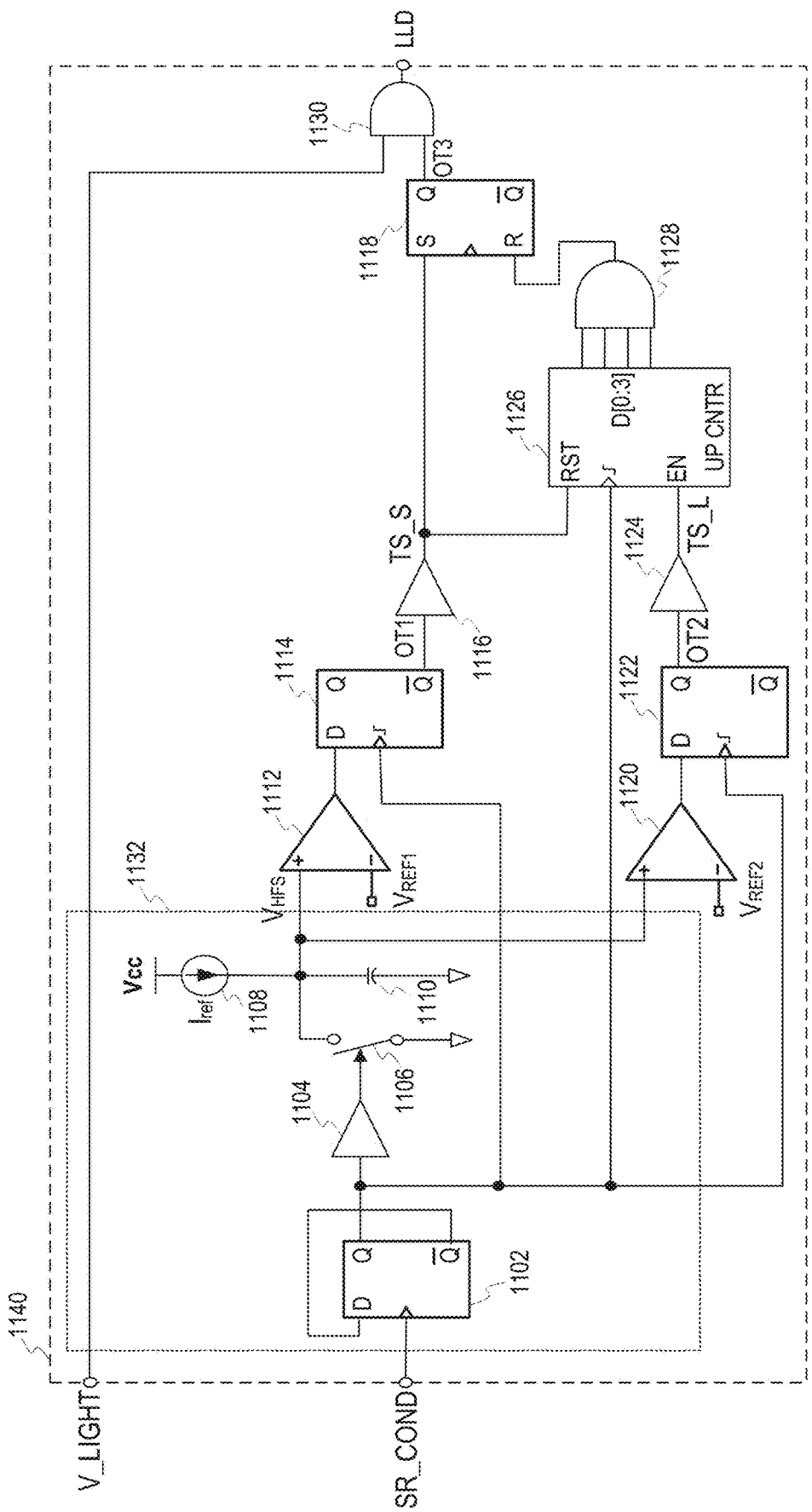
FIG. 11A illustrates a light load detection (LLD) circuit suitable for use in an SR controller according to an embodiment.

FIG. 11A illustrates an LLD circuit 1140 suitable for use as the LLD circuit 440 of the SR controller 420 of FIG. 4A according to an embodiment. The LLD circuit 1140 receives a SR conduction signal SR_COND and an operation mode signal V_LIGHT. Using these signals, the LLD circuit 1140 generates a light load detection signal LLD.

The LLD circuit 1140 in FIG. 11A includes a period calculator 1132, which includes a toggle flip-flop (TFF) 1102, a first buffer 1104, a switching device 1106, a current source 1108, and a capacitor 1110. The LLD circuit 1140 further includes first and second comparators 1112 and 1120, first and second DFFs 1114 and 1122, second and third buffers 1116 and 1124, an up counter 1126, first and second AND gates 1128 and 1130, and an SRFF 1118.

The TFF 1102 in FIG. 11A receives the SR conduction signal SR_COND as a clock signal and generates an output signal Q having a period that is twice as long as a period of the SR conduction signal SR_COND and having a 50% duty cycle, so that the output signal Q is de-asserted for a period of time equal to the period of the SR conduction signal SR_COND. The first buffer 1104 in FIG. 11A receives the output signal Q of the TFF 1102 and generates a delayed version of the output signal Q.

The switching device 1106 in FIG. 11A receives the delayed version of the output signal Q and is turned on a given delay interval after the output signal Q is asserted. In an embodiment, the given delay interval is a predetermined delay interval and corresponds to a delay interval (e.g., 30 ns) through the first buffer 1104. When the switching device 1106 is turned on, the first capacitor 1110 is coupled to ground, thereby resetting a value of a period signal (e.g., a period voltage) $V_{HFS}$ to a value of zero.

When the switching device 1106 is turned off, the current source 1108 is coupled to the capacitor 1110, thereby increasing the value of the period voltage $V_{HFS}$. The period voltage $V_{HFS}$ has a maximum value that is proportional to a half of the period of the output signal Q of the TFF 1102, which corresponds to the period of the SR conduction signal SR_COND, thereby indicating the period of the SR conduction signal SR_COND.

The first comparator 1112 in FIG. 11A has a non-inverting input receiving the period voltage $V_{HFS}$ and an inverting input receiving a first reference voltage $V_{REF1}$. The first comparator 1112 asserts an output signal in response to the period voltage $V_{HFS}$ being greater than the first reference voltage $V_{REF1}$.

The first DFF 1114 in FIG. 11A has a data input D receiving the output signal of the first comparator 1112 and a positive-edge triggered clock input receiving the output signal Q of the TFF 1102. The first DFF 1114 produces a first output signal OT1 by latching the output signal of the first comparator 1112 in response to a rising edge of the output signal Q of the TFF 1102.

The second buffer 1116 in FIG. 11A receives the first output signal OT1 of the first DFF 1114 and generates a short period signal TS_S, which is a delayed version of the first output signal OT1. In an embodiment, the second buffer 1116 delays the first output signal OT1 by a given delay interval (e.g., 50 ns).

The second comparator 1120 in FIG. 11A has a non-inverting input receiving the period voltage $V_{HFS}$ and an inverting input receiving a second reference voltage $V_{REF2}$. The second comparator 1120 asserts an output signal in response to the period voltage $V_{HFS}$ being greater than the second reference voltage $V_{REF2}$.

The second DFF 1122 in FIG. 11A has a data input D receiving the output signal of the second comparator 1120 and a positive-edge triggered clock input receiving the output signal Q of the TFF 1102. The second DFF 1122 produces a second output signal OT2 by latching the output signal of the second comparator 1120 in response to the rising edge of the output signal Q of the TFF 1102.

The third buffer 1124 in FIG. 11A receives the second output signal OT2 of the first DFF 1122 and generates a long period signal TS_L, which is a delayed version of the second output signal OT2. In an embodiment, the third buffer 1124 delays the second output signal OT2 by a given delay interval (e.g., 50 ns).

The up counter 1126 in FIG. 11A has a positive-edge triggered clock input receiving the output signal Q of the TFF 1102, a reset input RST receiving the short period signal TS_S, and an enable input EN receiving the long period signal TS_L. The up counter 1126 produce a 4-bit unsigned count D[0:3] according to the received signals. When the short period signal TS_S is asserted, the up counter 1126 outputs a value of 0 on the unsigned count D[0:3]. When the short period signal TS_S is de-asserted, the long period signal TS_L is asserted, and a rising edge occurs on the output signal Q of the TFF 1102, the up counter 1126 increases the value of the unsigned count D[0:3] by one. In an embodiment, when the unsigned count D[0:3] is at a maximum value (that is, when every bit of D[0:3] is one), the short period signal TS_S is de-asserted, the long period signal TS_L is asserted, and a rising edge occurs on the output signal Q of the TFF 1102, the unsigned count D[0:3] remains at the maximum value instead of being increased by one.

The first AND gate 1128 in FIG. 11A produces an output signal that is asserted when the unsigned count D[0:3] is at the maximum value, and de-asserted otherwise.

The SRFF 1118 in FIG. 11A sets a third output signal OT3 to an asserted value (e.g., a logic high value) in response to the short period signal TS_S being asserted. The SRFF 1118 resets the third output signal OT3 to a de-asserted value (e.g., a logic low value) in response to the output signal of the first AND gate 1128 being asserted.

The second AND gate 1130 in FIG. 11A receives the third output signal OT3 and the operation mode signal V_LIGHT. The second AND gate 1130 asserts the light load detection signal LLD when the third output signal OT3 is asserted and the operation mode signal V_LIGHT is asserted, and is de-asserted otherwise.

Figure 11B:
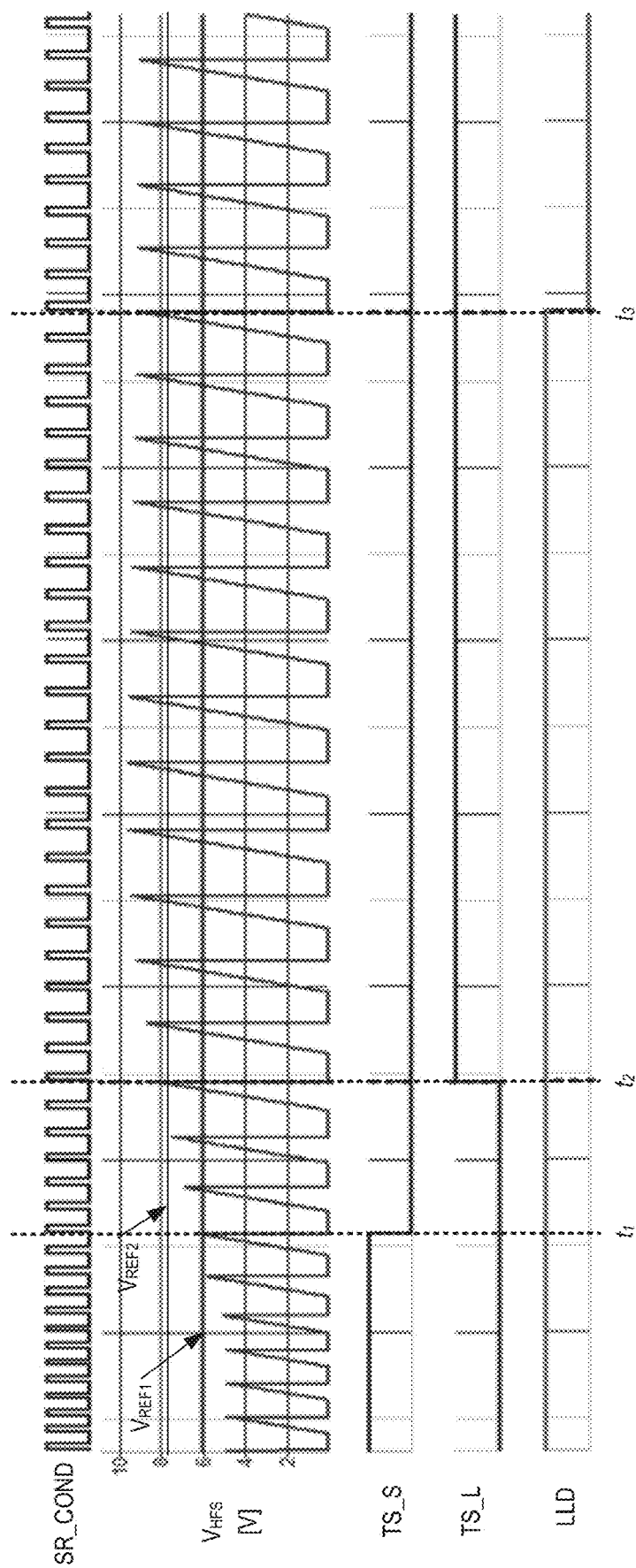
FIG. 11B includes waveforms illustrating operation of the LLD circuit of FIG. 11A according to an embodiment.

FIG. 11B includes waveforms illustrating operation during a period when the light load detection signal LLD transitions from an asserted value (e.g., a logic high value) to a de-asserted value (e.g., a logic low value) according to an embodiment. FIG. 11B includes waveforms of the SR conduction signal SR_COND, the period voltage $V_{HFS}$, the short period signal TS_S, the long period signal TS_L, and the light load detection signal LLD. The operation mode signal V_LIGHT (not shown) is asserted during the period illustrated in FIG. 11B.

At a first time $t_1$, the period of the SR conduction signal SR_COND becomes sufficiently long to make the period voltage $V_{HFS}$ greater than the first reference voltage $V_{REF1}$. As a result, the first output signal OT1 is de-asserted, and subsequently the short period signal TS_S is de-asserted.

At a second time $t_2$, the period of the SR conduction signal SR_COND becomes sufficiently long to make the period voltage $V_{HFS}$ greater than the second reference voltage $V_{REF2}$. As a result, the second output signal OT2 is asserted, and subsequently the long period signal TS_L is asserted. The up counter 1126 in FIG. 11A increases the value of the unsigned count D[0:3] by one in response to a rising edge of the output signal Q of the TFF 1102 until the value of the unsigned count D[0:3] reaches the maximum value.

At a third time $t_3$, the value of the unsigned count D[0:3] reaches the maximum value and the SRFF 1118 in FIG. 11A de-asserts the third output signal OT3. As a result, the second AND gate 1130 in FIG. 11A de-asserts the light load detection signal LLD.

Figure 12A:
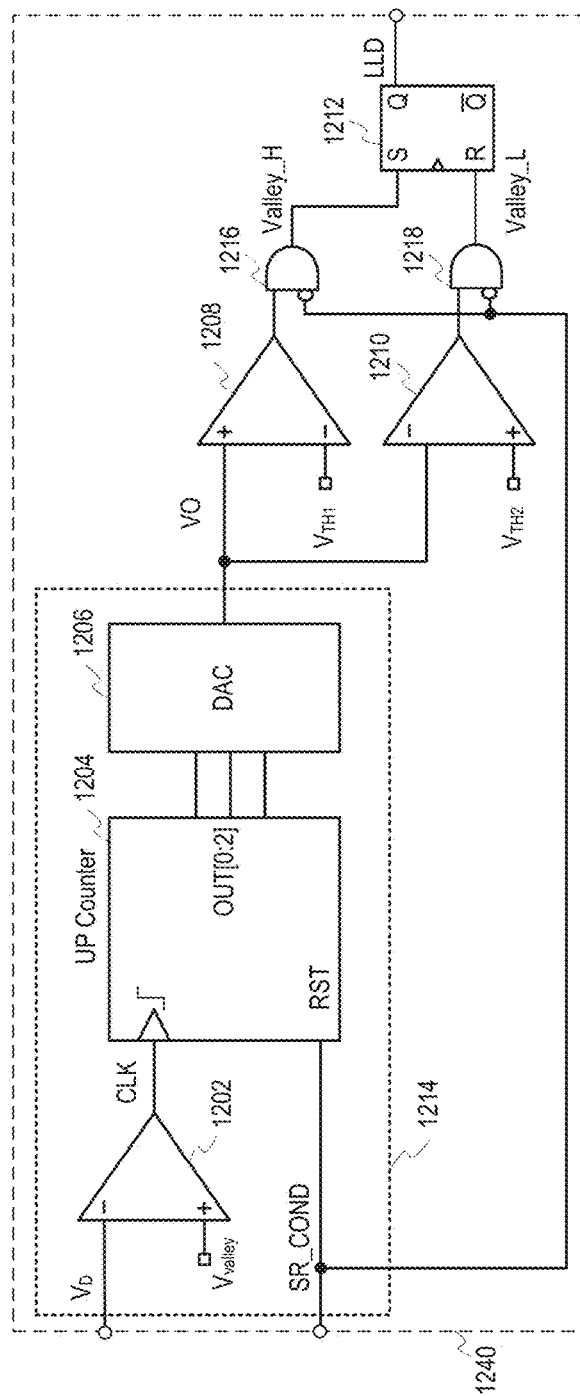
FIG. 12A illustrates a light load detection (LLD) circuit suitable for use in an SR controller according to an embodiment.

FIG. 12A illustrates an LLD circuit 1240 according to an embodiment. Unlike the above-described embodiments with reference to FIGS. 7A, 8, 9, 10, and 11A, the LLD circuit 1240 in FIG. 12A receives a SR conduction signal SR_COND and generates a light load detection signal LLD without using an operation mode signal (such as the operation mode signal V_LIGHT in FIG. 4A).

The LLD circuit 1240 in FIG. 12A detects the light load condition by determining a number of valleys (corresponding to a number of oscillations caused by ringing) in a voltage (such as a drain voltage) of a SR switching device (such as the SR switching device 222 of FIG. 2) when the SR switching device is turned off. The oscillations caused by ringing may occur during a zero-current interval in which an energy storage device (such as an inductor or the transformer 216 of FIG. 2) of a SMPS operating in DCM has no current flowing into it. The duration of the zero-current interval increases as the load decreases, and the number of oscillations caused by ringing (and therefore the number of valleys) corresponds to the duration of the zero-current interval.

The LLD circuit 1240 in FIG. 12A includes a valley detector 1214, first and second comparators 1208 and 1210, first and second AND gates 1216 and 1218, and an SRFF 1212.

The valley detector 1214 in FIG. 12 includes a comparator 1202, an up counter 1204 having 3 bits, and a DAC 1206.

The comparator 1202 in FIG. 12A has an inverting input receiving a drain voltage $V_D$ and a non-inverting input receiving a valley threshold voltage $V_{valley}$. The comparator 1202 asserts a clock signal CLK in response to the drain voltage $V_D$ being less than the valley threshold voltage $V_{valley}$.

The up counter 1204 in FIG. 12A has a positive-edge triggered clock input receiving the clock signal CLK of the comparator 1202 and a reset input RST receiving the SR conduction signal SR_COND. The up counter 1204 generates an unsigned count OUT[0:2] using the received signals. The up counter 1204 increments the unsigned count OUT[0:2] in response to a rising edge of the clock signal CLK until a maximum count is reach. The up counter 1204 resets the unsigned count OUT[0:2] to zero when the SR conduction signal SR_COND is asserted.

The DAC 1206 in FIG. 12A receives the unsigned count OUT[0:2] and generates an analog output signal (or a valley signal) VO having a value corresponding to the unsigned count OUT[0:2].

The first comparator 1208 in FIG. 12A has a non-inverting input receiving the valley signal VO and an inverting input receiving a first threshold voltage $V_{TH1}$. The first comparator 1208 asserts an output signal in response to the valley signal VO being greater than the first threshold voltage $V_{TH1}$.

The first AND gate 1216 in FIG. 12A receives the output signal of the first comparator 1208 and an inverted version of the SR conduction signal SR_COND. The first AND gate 1216 asserts a high valley signal Valley_H when the output signal of the first comparator 1208 is asserted and the inverted version of the SR conduction signal SR_COND is asserted, and is de-asserted otherwise.

The second comparator 1210 in FIG. 12A has an inverting input receiving the valley signal VO and a non-inverting input receiving a second threshold voltage $V_{TH2}$. The second comparator 1210 asserts an output signal in response to the valley signal VO being less than the second threshold voltage $V_{TH2}$.

The second AND gate 1218 in FIG. 12A receives the output signal of the second comparator 1210 and an inverted version of the SR conduction signal SR_COND. The second AND gate 1218 asserts a low valley signal Valley_L when the output signal of the second comparator 1210 is asserted and the inverted version of the SR conduction signal SR_COND is asserted, and is de-asserted otherwise.

The SRFF 1212 in FIG. 12A asserts the light load detection signal LLD in response to the high valley signal Valley_H being asserted; that is, when the number of valleys since the last assertion of the SR conduction signal SR_COND is greater than a first threshold value corresponding to the first threshold voltage $V_{TH1}$, and keeps the light load detection signal LLD asserted until the low valley signal Valley_L is asserted. The SRFF 1212 de-asserts the light load detection signal LLD in response to the low valley signal Valley_L being asserted; that is, when the number of valleys since the last assertion of the SR conduction signal SR_COND is less than a second threshold value corresponding to the second threshold voltage $V_{TH2}$, and keeps the light load detection signal LLD de-asserted until the high valley signal Valley_H is again asserted.

Accordingly, the LLD circuit 1240 in FIG. 12A asserts the light load detection signal LLD in response to a number of valleys between subsequent assertions of the SR conduction signal SR_COND becoming greater than or equal to a first threshold value, and keeps the light load detection signal LLD asserted until the number of valleys drops below a second threshold value. In embodiments, the second threshold value is less than the first threshold value.

Figure 12B:
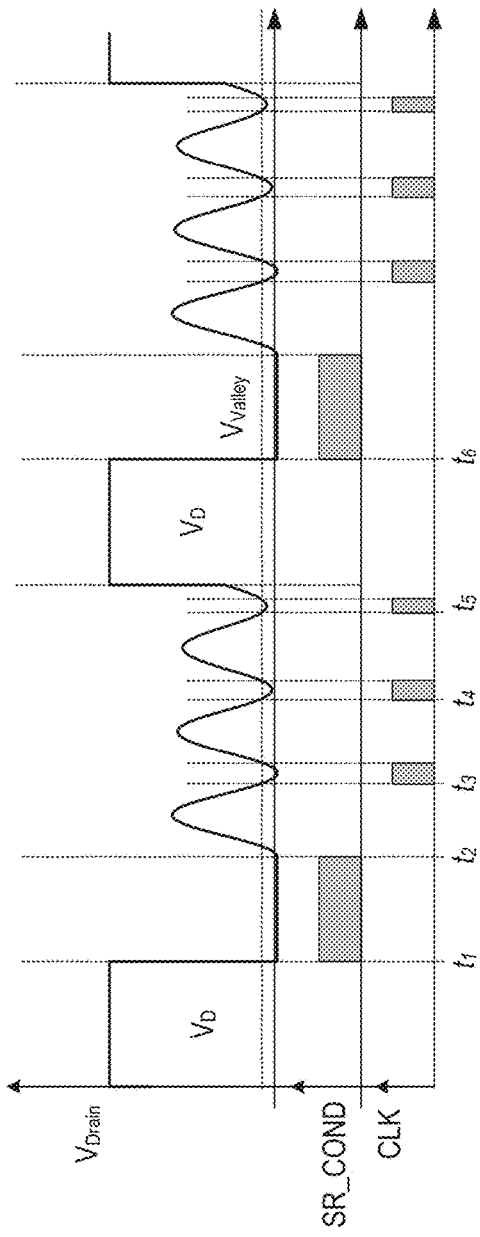
FIG. 12B includes waveforms illustrating operation of the LLD circuit of FIG. 12A according to an embodiment.

FIG. 12B includes waveforms illustrating operation of a power converter (e.g., the flyback converter 200 in FIG. 2) that includes the LLD circuit 1240 in FIG. 12A according to an embodiment. FIG. 12B includes waveforms of the drain voltage $V_D$, the SR conduction signal SR_COND, and the clock signal CLK.

At the first time $t_1$, the SR conduction signal SR_COND is asserted, and an SR switching device (e.g., the SR switching device 222) is turned on. A magnitude of a current flowing through the SR switching device starts to decrease during a time interval between the first time $t_1$ and a second time $t_2$.

At the second time $t_2$, the magnitude of the current reaches to a value of zero before the end of a period of the SR conduction signal SR_COND, which indicates that the power converter operates in DCM. Because the power converter operates in DCM, rather than CCM, the LLD circuit 1240 in FIG. 12A may not use an operation mode signal (e.g., the operation mode signal V_LIGHT in 4) to determine whether the power converter operates in a light load condition. The drain voltage $V_D$ starts to oscillate after the SR conduction signal SR_COND is de-asserted.

At third, fourth, and fifth times $t_3$, $t_4$, and $t_5$, the drain voltage $V_D$ becomes less than the valley threshold voltage $V_{valley}$, and the comparator 1202 in FIG. 12A asserts the clock signal CLK. At each of the third, fourth, and fifth times $t_3$, $t_4$, and $t_5$, the up counter 1204 increases the value of the unsigned count OUT[0:2] by one.

At a sixth time $t_6$, the SR conduction signal SR_COND is again asserted and resets the value of the unsigned count OUT[0:2] of the up counter 1204.

The first comparator 1208 in FIG. 12A has a non-inverting input receiving the valley signal VO and an inverting input receiving a first threshold voltage $V_{TH1}$. The first comparator 1208 asserts a high valley signal Valley_H in response to the valley signal VO having a value greater than the first threshold voltage $V_{TH1}$.

The second comparator 1210 in FIG. 12A has an inverting input receiving the valley signal VO and a non-inverting input receiving a second threshold voltage $V_{TH2}$. The second AND gate 1218 asserts a low valley signal Valley_L in response to the valley signal VO having a value less than the second threshold voltage $V_{TH2}$ and the inverted version of the SR conduction signal SR_COND being asserted.

When a number of detected valleys at the third, fourth, and fifth times $t_3$, $t_4$, and $t_5$ is greater than a first given number corresponding to the first threshold voltage $V_{TH1}$, the first AND gate 1216 asserts the high valley signal Valley_H, thereby asserting the light load detection signal LLD. The light load detection signal LLD having an asserted value (e.g., a logic high value) indicates that the power converter including the LLD circuit 1240 in FIG. 12A operates in a light load condition. When the number of detected valleys is less than a second given number corresponding to the second threshold voltage $V_{TH2}$, the second comparator 1210 asserts the low valley signal Valley_L to de-assert the light load detection signal LLD.

Figure 13:
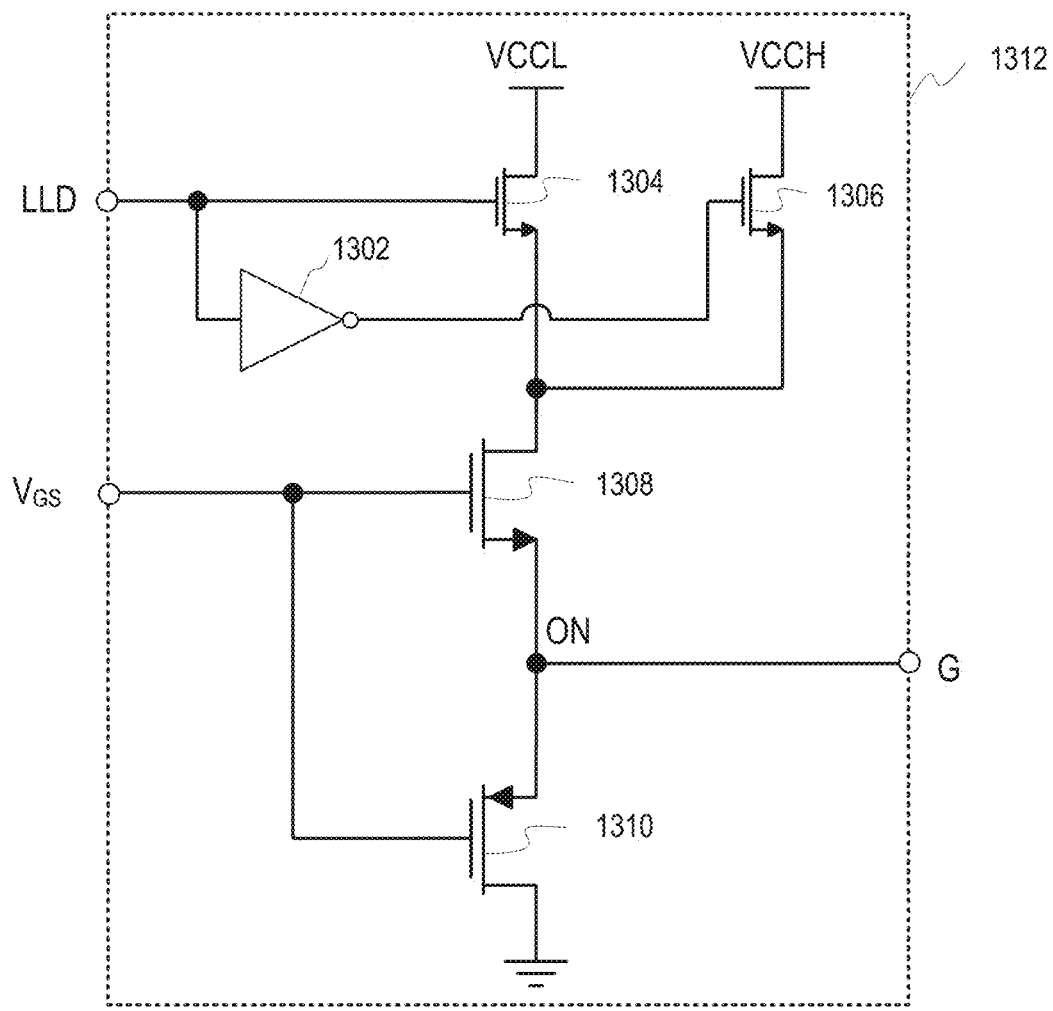
FIG. 13 illustrates an SR driver suitable for use in an SR controller according to an embodiment.

FIG. 13 illustrates an SR driver 1312 suitable for use as the SR driver 412 of FIG. 4A according to an embodiment. The SR driver 1312 includes an inverter 1302, first, second, third, and fourth switching devices 1304, 1308, 1306, and 1310, a first supply voltage (e.g., a low supply voltage) VCCL, a second supply voltage (e.g., a high supply voltage) VCCH, and an output node ON.

The first switching device 1304 in FIG. 13 is turned on in response to a light load detection signal LLD having an asserted value (e.g., a logic high value). The second switching device 1308 in FIG. 13 is turned on in response to a gate signal $V_{GS}$ having an asserted value (e.g., a logic high value). The fourth switching device 1310 is turned on in response to the gate signal $V_{GS}$ having a de-asserted value (e.g., a logic low value).

The inverter 1302 in FIG. 13 receives the light load detection signal LLD and generates an inverted version of the light load detection signal LLD. The third switching device 1306 in FIG. 13 is turned on in response to the light load detection signal LLD having a de-asserted value (e.g., a logic low value).

When the light load detection signal LLD is de-asserted and the gate signal $V_{GS}$ is asserted, the second and third switching devices 1308 and 1306 are turned on to couple the high supply voltage VCCH to the output node ON. As a result, the SR driver 1312 provides a signal (e.g., a voltage) at the output node ON having a first value corresponding to the high supply voltage VCCH as a gate control signal G.

When the light load detection signal LLD is asserted and the gate signal $V_{GS}$ is asserted, the first and second switching devices 1304 and 1308 are turned on to couple the low supply voltage VCCL to the output node ON. As a result, the SR driver 1312 provides the voltage at the output node ON having a second value corresponding to the low supply voltage VCCL as the gate control signal G.

When the gate signal $V_{GS}$ is de-asserted, the fourth switching device 1310 couples the gate control signal G to ground. As a result, the SR driver 1312 provides the voltage at the output node ON having a third value corresponding to the ground voltage as the gate control signal G.

When a power converter (e.g., the flyback converter 200 in FIG. 2) including the SR driver 1312 and an SR switching device (e.g., the SR switching device 222 of FIG. 2) operates in a light load condition, a switching loss for driving the SR switching device becomes significant in the total amount of power loss of the power converter. Because the switching loss is proportional to the square of the value of the gate control signal G, the gate control signal G having a smaller value in the light load condition than that in a heavy load condition can reduce the amount of the switching loss, thereby leading to an increase in power efficiency of the power converter in the light load condition. However, when the power converter operates in a heavy load condition, total losses may be minimized by using a higher voltage value of the gate control signal G.

Accordingly, overall circuit efficiency across a range of load conditions may be improved by detecting a light load condition, producing the gate control signal G having a first voltage value when the light load condition is detected, and producing the gate control signal G having a second voltage value when the light load condition is not detected, wherein the second voltage value is greater than the first voltage value. In illustrative embodiments, the first voltage value may be 5V or 7V and the second voltage may be 10V, but embodiments of the present disclosure are not limited thereto.

Figure 14:
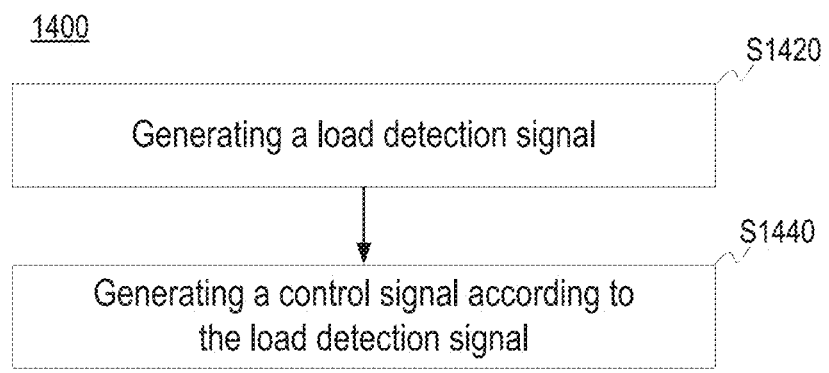
FIG. 14 illustrates a process performed by a power converter according to an embodiment.

FIG. 14 illustrates a process 1400 performed by a power converter (e.g., the power converters 200 in FIGS. 2 and 300 in FIG. 3). In an embodiment, the power converter includes a switching device (e.g., the switching device 222 in FIG. 2), a light load detection circuit (e.g., the light load detection circuit 440 in FIG. 4A), and an SR driver (e.g., the SR driver 412 in FIG. 4A).

At S1420, the light load detection circuit generates a load detection signal in response to a conduction signal and one or both of an operation mode signal and a detected signal of the switching device. In an embodiment, the light load detection circuit generates the load detection signal in response to the conduction signal (e.g., the SR conduction signal SR_COND in FIG. 7A) and the operation mode signal (e.g., the operation mode signal V_LIGHT in FIG. 7A). In another embodiment, the light load detection circuit generates the load detection signal in response to the conduction signal (e.g., the SR conduction signal SR_COND in FIG. 12A) and the detected signal (e.g., the drain voltage $V_D$ in FIG. 12A).

At S1440, the SR driver generates a control signal (e.g., the gate control signal G in FIG. 4A), which has a first value when the load detection signal is asserted and having a second value when the load detection signal is de-asserted. In an embodiment, the first value is less than the second value.

Embodiments of the present disclosure include electronic devices, e.g., one or more packaged semiconductor devices, configured to perform one or more of the operations described herein. However, embodiments are not limited thereto.

While this invention has been described in connection with what is presently considered to be practical embodiments, embodiments are not limited to the disclosed embodiments, but, on the contrary, may include various modifications and equivalent arrangements included within the spirit and scope of the appended claims. The order of operations described in a process is illustrative and some operations may be re-ordered. Further, two or more embodiments may be combined.

What is claimed is:

1. A circuit for controlling a power converter, the circuit comprising:
    a synchronous rectifier (SR) switching device;
    a light load detection circuit configured to generate a load detection signal in response to a conduction signal and an operation mode signal; and
    an SR driver configured to generate a control signal according to the load detection signal and a gate signal and to provide the control signal to the SR switching device,
    wherein the SR driver generates the control signal having a first value when the light load detection signal is de-asserted and the gate signal is asserted to turn on the SR switching device, and the SR driver generates the control signal having a second value when the light load detection signal is asserted and the gate signal is asserted to turn on the SR switching device, the second value being less than the first value.

2. The circuit of claim 1, further comprising:
    an operation mode signal circuit to generate the operation mode signal according to an off threshold signal, the operation mode signal being asserted in response to the off threshold signal being within a given range, the given range corresponding to the power converter operating in a mode under a light load condition,
    wherein the light load detection circuit generates the load detection signal in response to the operation mode signal and the conduction signal.

3. The circuit of claim 2, wherein the light load detection circuit includes:
    a duty calculator generating an intermediate signal in response to the conduction signal, the intermediate signal indicating a duty cycle of the conduction signal; and
    a logic gate asserting the light load detection signal when the duty cycle of the conduction signal is less than a given value and the operation mode signal is asserted.

4. The circuit of claim 3, wherein the light load detection circuit further includes:
    a sample and hold circuit sampling a value of the intermediate signal in response to the conduction signal;
    a first comparator comparing the sampled value to a value of a first threshold signal to generate a first duty signal; and
    a second comparator comparing the sampled value to a value of a second threshold signal to generate a second duty signal,
    wherein the logic gate de-asserts the light load detection signal when the second duty signal is asserted.

5. The circuit of claim 2, wherein the light load detection circuit includes:
    an on-time calculator generating an on-time signal in response to the conduction signal, the on-time signal indicating an on-time duration of the conduction signal; and
    a logic gate asserting the load detection signal when the on-time duration of the conduction signal is less than a given value and the operation mode signal is asserted.

6. The circuit of claim 2, wherein the light load detection circuit includes:
    an off-time calculator generating an off-time signal in response to the conduction signal, the off-time signal indicating an off-time duration of the conduction signal; and
    a logic gate asserting the load detection signal when the off-time duration of the conduction signal is greater than a given value and the operation mode signal is asserted.

7. The circuit of claim 2, wherein the mode under the light load condition is a discontinuous conduction mode or a critical conduction mode when the power converter is a flyback converter, or
    wherein the mode under the light load condition is a below resonance mode when the power converter is an inductor-inductor-capacitor (LLC) converter.

8. The circuit of claim 1, wherein the SR driver generates the control signal having a third value when the gate signal is de-asserted, the third value being less than the second value.

9. The circuit of claim 1, wherein the SR driver receives the gate signal and delays the received gate signal with a turn on delay to generate the control signal.

10. The circuit of claim 1, wherein the light load detection circuit asserts a duty signal when a duty cycle of the conduction signal is equal to or less than a given value, and asserts the load detection signal when a number of asserting the duty signal reaches a given number.

11. The circuit of claim 1, wherein the light load detection circuit keeps a duty signal de-asserted when a duty cycle of the conduction signal is greater than a given value, and de-asserts the load detection signal when the duty signal remains de-asserted for a given number of cycles of the conduction signal.

12. The circuit of claim 1, wherein the conduction signal indicates that the switching device is conducting a current, and the operating mode signal indicates that the power converter is operating in a specific mode under a light load condition.

13. A method of controlling a power converter, the method comprising:
- generating, by a light load detection circuit, a load detection signal in response to a conduction signal and an operation mode signal; and
- generating, by a synchronous rectifier (SR) driver, a control signal according to the load detection signal and a gate signal, the control signal having a first value when the load detection signal is de-asserted and the gate signal is asserted to turn on a switching device, the control signal having a second value when the load detection signal is asserted and the gate signal is asserted to turn on the switching device, the second value being less than the first value.

14. The method of claim 13, further comprising:
- asserting the operation mode signal in response to an off threshold signal being within a given range, the given range corresponding to the power converter operating in a mode under a light load condition.

15. The method of claim 14, further comprising:
- generating an intermediate signal in response to the conduction signal, the intermediate signal indicating a duty cycle of the conduction signal; and
- asserting the light load detection signal when the duty cycle of the conduction signal is less than a given value and the operation mode signal is asserted.

16. The method of claim 15, further comprising:
- sampling a value of the intermediate signal in response to the conduction signal;
- comparing the sampled value to a value of a first threshold signal to generate a first duty signal;
- comparing the sampled value to a value of a second threshold signal to generate a second duty signal; and
- de-asserting the light load detection signal when the second duty signal is asserted.

17. A power converter, comprising:
- a first control circuit disposed on a first side of the power converter, the first control circuit being configured to control a first switching device;
- a second control circuit disposed on a second side of the power converter, the second control circuit being configured to control a second switching device using a control signal, the second control circuit comprising:
  - a light load detection circuit configured to generate a load detection signal in response to a conduction signal and an operation mode signal, the operating mode signal indicating that the power converter is operating in a specific mode under a light load condition; and
  - an SR driver configured to generate the control signal according to the load detection signal and a gate signal and to provide the control signal to the SR switching device,
- wherein the SR driver generates the control signal having a first value when the light load detection signal is de-asserted and the gate signal is asserted to turn on the second switching device, and generates the control signal having a second value when the light load detection signal is asserted and the gate signal is asserted to turn on the second switching device, the second value being less than the first value.

* * * * *